US012574663B2

(12) United States Patent
Yang

(10) Patent No.: US 12,574,663 B2
(45) Date of Patent: Mar. 10, 2026

(54) IMAGE SENSOR, CAMERA ASSEMBLY, AND MOBILE TERMINAL

(71) Applicant: GUANGDONG OPPO MOBILE TELECOMMUNICATIONS CORP., LTD., Guangdong (CN)

(72) Inventor: Xin Yang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 130 days.

(21) Appl. No.: 18/538,721

(22) Filed: Dec. 13, 2023

(65) Prior Publication Data

US 2024/0114266 A1 Apr. 4, 2024

Related U.S. Application Data

(63) Continuation of application No. PCT/CN2022/090345, filed on Apr. 29, 2022.

(30) Foreign Application Priority Data

Jun. 18, 2021 (CN) .......................... 202110680651.X

(51) Int. Cl.
*H04N 25/779* (2023.01)
*H04N 23/55* (2023.01)
(Continued)

(52) U.S. Cl.
CPC ........... *H04N 25/779* (2023.01); *H04N 23/55* (2023.01); *H04N 23/57* (2023.01); *H04N 25/40* (2023.01); *H04N 25/75* (2023.01); *H04N 25/772* (2023.01)

(58) Field of Classification Search
CPC ...... H04N 25/779; H04N 23/55; H04N 23/57; H04N 25/40; H04N 25/75; H04N 25/772;
(Continued)

(56) References Cited

U.S. PATENT DOCUMENTS

| | | | |
|---|---|---|---|
| 2008/0062290 A1* | 3/2008 | Lahav | ................. H10F 39/8053 |
| | | | 348/E9.01 |
| 2010/0214462 A1 | 8/2010 | Itakura | |

(Continued)

FOREIGN PATENT DOCUMENTS

| | | |
|---|---|---|
| CN | 102857706 A | 1/2013 |
| CN | 102282839 B | 1/2015 |

(Continued)

OTHER PUBLICATIONS

European Search Report, European Application No. 22823926.5, mailed Jul. 29, 2024 (17 pages).
(Continued)

*Primary Examiner* — Lin Ye
*Assistant Examiner* — Chan T Nguyen
(74) *Attorney, Agent, or Firm* — Ladas & Parry LLP

(57) ABSTRACT

An image sensor includes: a pixel array, the pixel array including a plurality of pixels, and each pixel including a plurality of sub-pixels, wherein the sub-pixels in a same pixel share a same floating diffusion region (FD); each pixel including a pixel circuit provided with a plurality of output ends, and the pixel circuit being used for transferring charges generated by at least one photoelectric conversion element in a same pixel to the FD for accumulation, and selecting at least one output end to output analog signals corresponding to the charges in the FD; and a plurality of first conversion circuits, each first conversion circuits being used for performing analog-to-digital conversion on each analog signal outputted by a same pixel circuit, and reading a converted digital signal together with the pixel circuit on the basis of a full-resolution output mode or a first-stage combined output mode.

20 Claims, 17 Drawing Sheets

(51) Int. Cl.
  *H04N 23/57*        (2023.01)
  *H04N 25/40*        (2023.01)
  *H04N 25/75*        (2023.01)
  *H04N 25/772*       (2023.01)

(58) Field of Classification Search
  CPC .... H04N 25/13; H04N 25/133; H04N 25/135;
        H04N 25/46; H04N 25/78; H04N 23/54;
                H04N 25/59; H04M 1/0264
  USPC ......................................................... 348/308
  See application file for complete search history.

(56)                References Cited

U.S. PATENT DOCUMENTS

| | | | |
|---|---|---|---|
| 2012/0062772 | A1 | 3/2012 | Osawa et al. |
| 2012/0092538 | A1 | 4/2012 | Kitami et al. |
| 2016/0373709 | A1 | 12/2016 | Hirota |
| 2017/0126993 | A1 | 5/2017 | Madurawe |
| 2017/0195603 | A1 | 7/2017 | Kawazu et al. |
| 2017/0302869 | A1 | 10/2017 | Ikuma et al. |
| 2018/0295297 | A1 | 10/2018 | Kim et al. |
| 2020/0314364 | A1* | 10/2020 | Kim ..................... H04N 25/447 |
| 2021/0067726 | A1 | 3/2021 | Ashitani et al. |
| 2021/0152758 | A1* | 5/2021 | Muraoka ................ H04N 25/77 |

FOREIGN PATENT DOCUMENTS

| | | |
|---|---|---|
| CN | 111656772 A | 9/2020 |
| CN | 111683233 A | 9/2020 |
| CN | 112188124 A | 1/2021 |
| CN | 112786630 A | 5/2021 |
| CN | 113242344 A | 8/2021 |
| CN | 113676625 A | 11/2021 |
| CN | 113747022 A | 12/2021 |
| JP | 2017059875 A | 3/2017 |

OTHER PUBLICATIONS

Chinese First Office Action,Chinese Application No. 202110680651. X, mailed Jan. 28, 2023 (14 pages).
Chinese second Office Action,Chinese Application No. 202110680651. X, mailed Jul. 31, 2023 (10 pages).
International Search Report, International Application No. PCT/CN2022/090345, mailed Jun. 16, 2022 (15 pages).
European Examination Report, European Application No. 22823926. 5, mailed Mar. 27, 2025 (32 pages).

* cited by examiner

20

IMAGE SENSOR, CAMERA ASSEMBLY, AND MOBILE TERMINAL

CROSS REFERENCE TO RELATED APPLICATION

The present application is a continuation application of the international patent application No. PCT/CN2022/090345, filed on Apr. 29, 2022, which claims priority of the Chinese patent application No. 202110680651.X, filed on Jun. 18, 2021, and contents of which are incorporated herein by its entireties.

TECHNICAL FIELD

The present disclosure relates to the field of images, and in particular to an image sensor, a camera assembly, and a mobile terminal.

BACKGROUND

Statements herein provide only background information relevant to the present disclosure and do not necessarily constitute prior art for the present disclosure.

A terminal such as a mobile phone may be arranged with a camera to capturing images. The camera may be arranged with an image sensor configured to receive light.

As demands for image sensors increase, techniques for improving quality of images generated by the image sensor are being developed. Generally, the image sensor may not generate both high-quality images captured in a bright scene and high-quality images captured in a dark scene.

SUMMARY OF THE DISCLOSURE

The present disclosure provides an image sensor, a camera assembly, and a mobile terminal.

An image sensor includes:

a pixel array, comprising a plurality of pixels, each of the plurality of pixels comprising a plurality of sub-pixels, wherein the plurality of sub-pixels in one of the plurality of pixels share one floating diffusion region; each of the plurality of pixels comprises a pixel circuit arranged with a plurality of output ends, the pixel circuit comprises a plurality of photoelectric conversion elements in one-to-one correspondence with the plurality of sub-pixels; the pixel circuit is configured to transfer charges, which are generated by at least one of the plurality of photoelectric conversion elements in the one of the plurality of pixels, to the floating diffusion region, the transferred charges are accumulated in the floating diffusion region; the pixel circuit is configured to select, based on the accumulated charges, at least one of the plurality of output ends of the pixel circuit to output an analogue signal corresponding to the charges in the floating diffusion region; and a plurality of first conversion circuits, corresponding to a plurality pixel circuits of the plurality of pixels, wherein each of the plurality of first conversion circuits is connected to the plurality of output ends of one of the plurality of pixel circuits; for each of the plurality of first conversion circuits and a corresponding one of the plurality pixel circuits corresponding to one of the plurality of pixels, the first conversion circuit is configured to perform analogue-to-digital conversion on the analogue signal output from the pixel circuit and to read out, cooperatively with the pixel circuit, a digital signal after the conversion based on either a full-resolution output mode or a primary merging output mode; wherein the full-resolution mode means that the digital signal is read out taking one sub-pixel as a unit, and the primary merging output mode means that the digital signal is read out taking one pixel as a unit.

A camera assembly includes:

a lens; and the image sensor as described in the above, wherein the image sensor is capable of receiving light passing through the lens.

A mobile terminal includes:

a housing; and the camera assembly as described in the above, wherein the camera assembly is coupled with the housing.

Details of one or more embodiments of the present disclosure are described in the accompanying drawings in the following. Other features, objectives, and advantages of the present disclosure will become apparent from the specification, the accompanying drawings, and the claims.

BRIEF DESCRIPTION OF THE DRAWINGS

In order to more clearly illustrate the technical solutions in the embodiments of the present disclosure or in the related art, the accompanying drawings for describing the embodiments or the related art will be introduced briefly in the following. Apparently, the following description of the accompanying drawings shows only some of the embodiments of the present disclosure. Any ordinary skilled person in the art may obtain other accompanying drawings based on the accompanying drawings without any creative work.

DETAILED DESCRIPTION

In order to make the purpose, technical solutions and advantages of the present disclosure clearer and more understandable, the present disclosure will be described in further detail hereinafter by referring to the accompanying drawings and embodiments. It should be understood that the specific embodiments described herein are only for explaining the present disclosure and do not limit the present disclosure.

It is to be understood that the terms "first", "second" and the like used herein may be used to describe various elements, but not limit the elements. These terms are used only to distinguish a first element from another element. For example, without departing from the scope of the present disclosure, a first conversion circuit may be referred to as a second conversion circuit. Similarly, the second conversion circuit may be referred to as the first conversion circuit. Each of the first conversion circuit and the second conversion circuit is a conversion circuit, but they are not the same conversion circuit.

Figure 1:
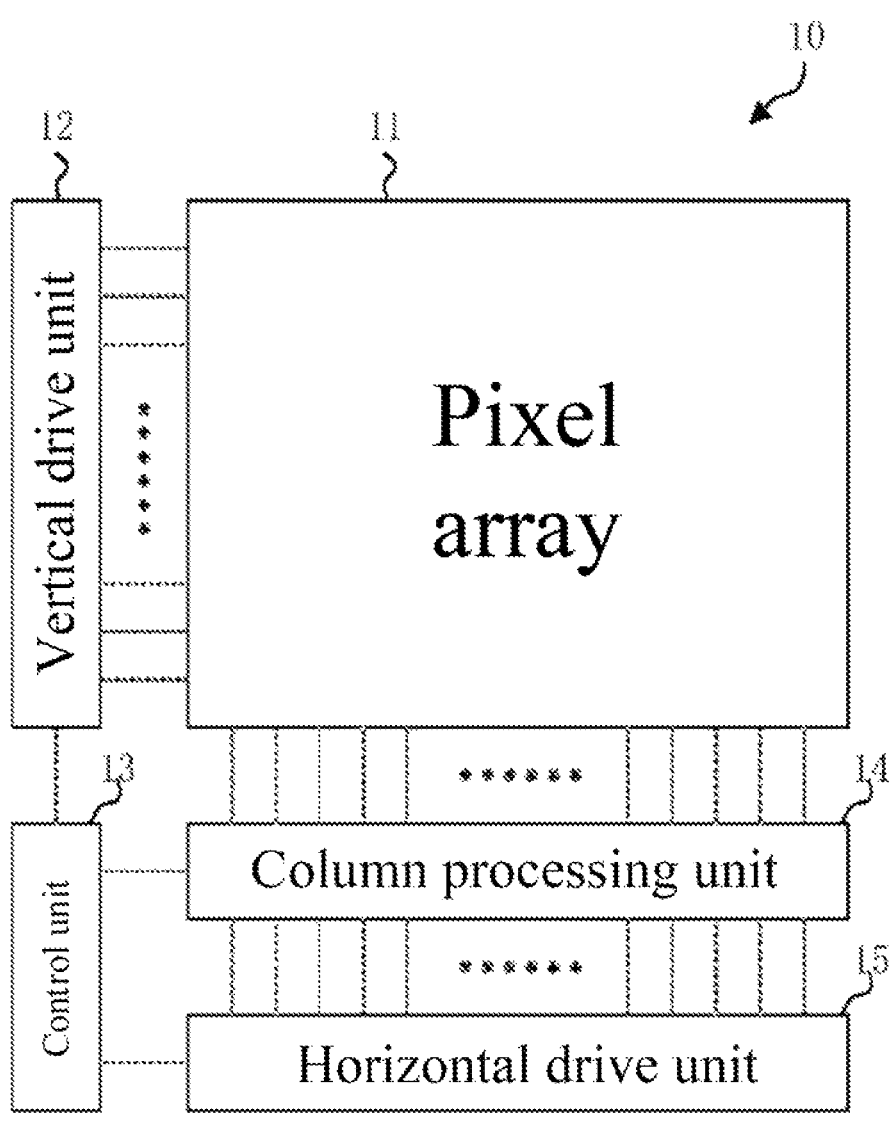
FIG. 1 is a schematic view of an image sensor according to an embodiment of the present disclosure.

As shown in FIG. 1, the present disclosure provides an image sensor. The image sensor 10 includes a pixel array 11, a vertical drive unit 12, a control unit 13, a column processing unit 14, and a horizontal drive unit 15.

The image sensor 10 may be a complementary metal oxide semiconductor (CMOS) light-sensitive element or a charge-coupled device (CCD) light-sensitive element.

Figure 2:
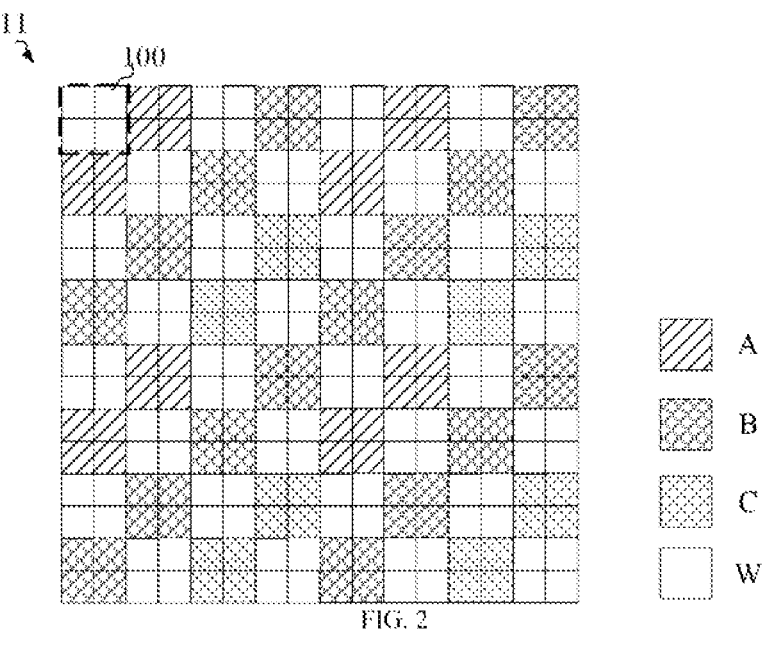
FIG. 2 is a schematic view of pixels arranged in an array according to an embodiment of the present disclosure.

As shown in FIG. 2, the pixel array 11 includes a plurality of pixels 110 arranged in two dimensions in an array (i.e., arranged in a two-dimensional matrix). Each of the plurality of pixels 110 may include a plurality of sub-pixels. Specifically, each pixel 110 may include n*m sub-pixels. One of n and m is a positive integer greater than or equal to 1, and the other one of n and m is a positive integer greater than or equal to 2. The n may be interpreted as the number of rows of sub-pixels in one pixel 110, and the m may be interpreted as the number of columns of sub-pixels in the one pixel 110. Exemplarily, each pixel 110 includes 4 sub-pixels, the 4 sub-pixels are arranged in a 2*2 array. That is, m=n=2. In the present embodiment, value ranges of the m and the n will not be limited.

All of the plurality of sub-pixels included in one pixel 110 has a same colour. All of the plurality of sub-pixels may be one of a full colour sub-pixel W, a first colour sub-pixel A, a second colour sub-pixel B, and a third colour sub-pixel C. Exemplarily, the first colour sub-pixel A may be a red sub-pixel R; the second colour sub-pixel B may be a green sub-pixel G; and the third colour sub-pixel C may be a blue sub-pixel Bu.

The vertical drive unit 12 includes a shift register and an address decoder. The vertical drive unit 12 includes a read-out scanning and a reset scanning. The read-out scanning refers to sequentially scanning the unit pixels 110 row by row and reading signals from the unit pixels 110 row by row. For example, the signals, which are output from each pixel 110 in a selected and scanned row of pixels 110, are transmitted to the column processing unit 14. The reset scanning is configured to reset charges. Photoelectric charges of a photoelectric converter element are discarded, such that new accumulation of photoelectric charges may be started.

For example, signal processing performed by the column processing unit 14 is correlated double sampling (CDS) processing. In the CDS processing, a reset level and a signal level, which are output from each pixel 110 in the selected row of pixels 110, are obtained, and a level difference is calculated. In this way, a signal of the pixels 110 in the row is obtained. The column processing unit 14 may have an analogue-to-digital (A/D) conversion function for converting the signal of the analogue pixels 110 into a digital format, and a function for averaging a plurality of digital signals after the A/D conversion.

For example, the horizontal drive unit 15 includes the shift register and the address decoder. The horizontal drive unit 15 sequentially scans the pixel array 11 column by column. Since the horizontal drive unit 15 performs a selective scanning operation, columns of pixels 110 are sequentially processed by the column processing unit 14, and signals are sequentially output.

For example, the control unit 13 configures a timing signal according to an operation mode. The vertical drive unit 12, the column processing unit 14, and the horizontal drive unit 15 are controlled by a plurality of timing signals to operate cooperatively.

Figure 3:
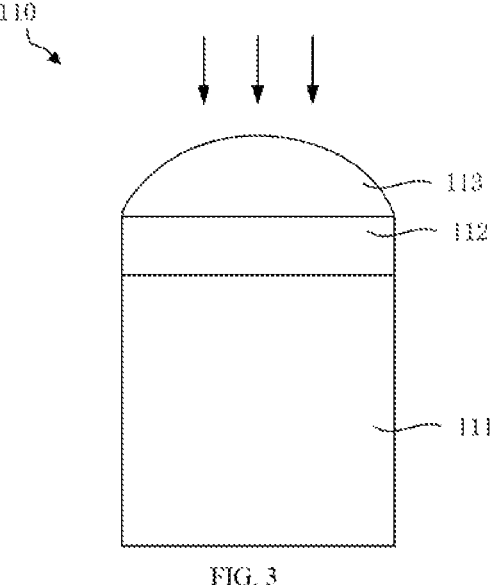
FIG. 3 is a cross-sectional view of a pixel according to an embodiment of the present disclosure.

As shown in FIG. 3, the pixel 110 includes a pixel circuit 111, a light filter 112, and a micro-lens 113. The micro-lens 113, the light filter 112, and the pixel circuit 111 are disposed sequentially along a light collection direction of the pixel 110. The micro-lens 113 is configured to converge light rays. The filter 112 is configured to allow light rays of a certain wavelength band to pass through and to filter out light rays of the remaining wavelength bands. The pixel circuit 111 is configured to convert the received light rays into electrical signals and to provide the generated electrical signals to the column processing unit 14 shown in FIG. 1.

Figure 4:
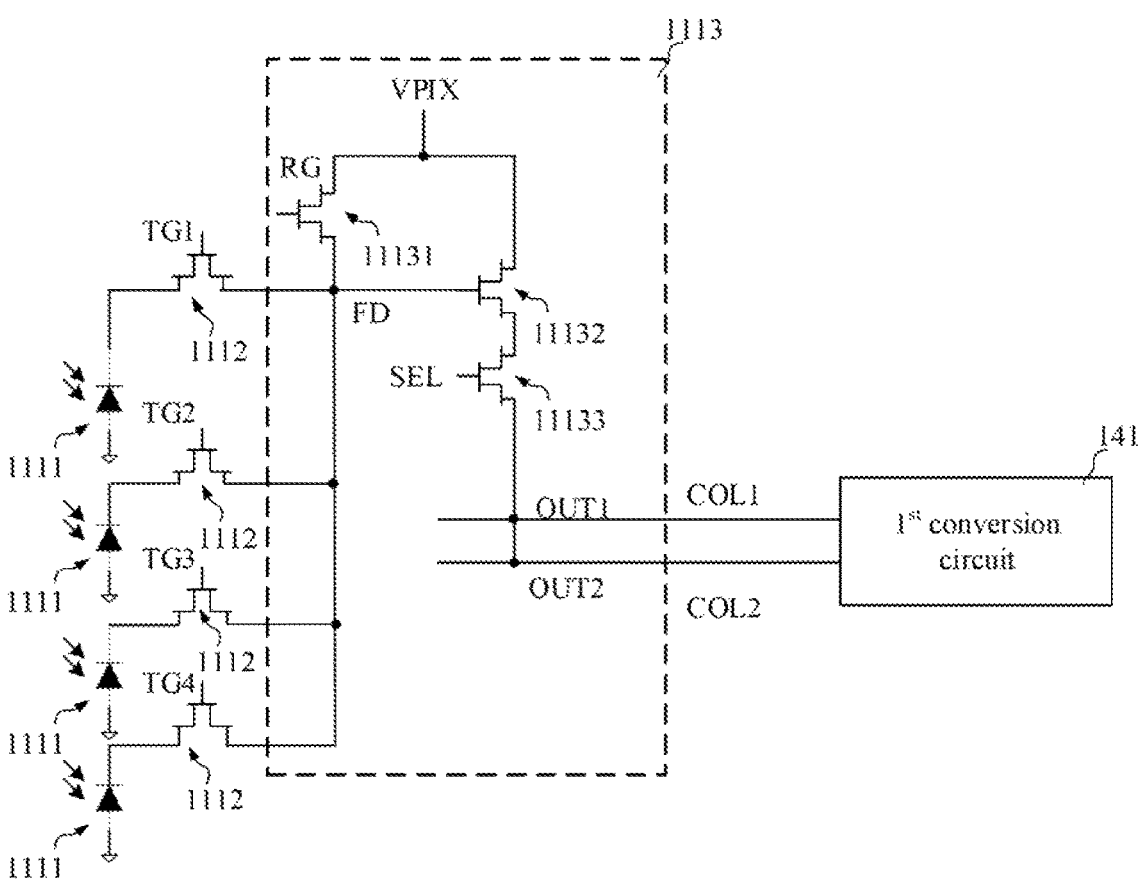
FIG. 4 is a schematic view of a pixel circuit according to an embodiment of the present disclosure.
Figure 5:
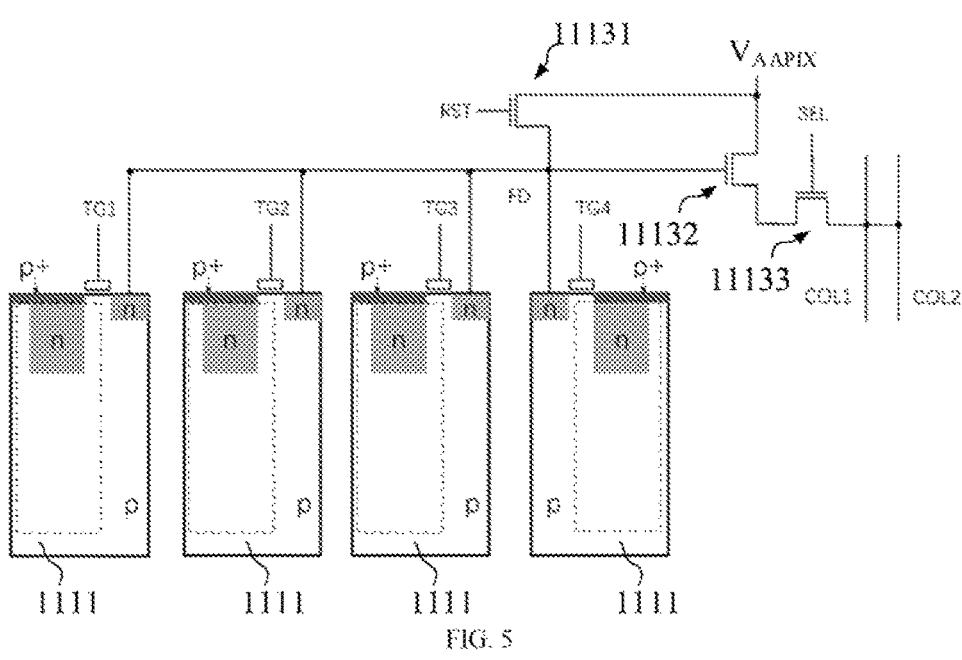
FIG. 5 is a schematic view of a pixel circuit according to another embodiment of the present disclosure.

As shown in FIG. 4 and FIG. 5, the pixel circuit 111 in FIG. 4 and FIG. 5 may be applied to each pixel 110 in the pixel array 11 shown in FIG. 2. Operation principles of the pixel circuit is described below by referring to FIG. 2 to FIG. 5.

The pixel circuit is configured to: transfer charges, which are accumulated by at least one photoelectric conversion element 1111 in one pixel, to a floating diffusion FD region; and to selectively conduct, according to the accumulated charge, at least one output end to output an analogue signal corresponding to the charges in the FD region. The pixel circuit includes a plurality of photoelectric conversion elements 1111, which are in one-to-one correspondence to the plurality of sub-pixels, a plurality of transfer transistors 1112, which are in one-to-one correspondence to the plurality of sub-pixels, and one read-out circuit 1113.

The number and arrangement of the photoelectric conversion elements 1111 are the same as the number and arrangement of the sub-pixels. Each photoelectric conversion element 1111 converts light into an electric charge based on intensity of light incident on the photoelectric conversion element 1111. The number of transfer transistors 1112 is equal to the number of photoelectric conversion elements 1111. The plurality of transfer transistors 1112 are in one-to-one connection with the plurality of photoelectric conversion elements 1111. The plurality of photoelectric conversion elements 1111 in one pixel 110 share the FD region in the pixel circuit 111. For example, the photoelectric conversion element 1111 includes a photodiode. For example, an anode of the photodiode is connected to the ground, and a cathode of the photodiode is connected to the FD region via the transfer transistor 1112. The transfer transistor 1112 is configured to transfer the charges generated by each photoelectric conversion element 1111 to the FD region.

The read-out circuit 1113 may be configured with a plurality of output ends. The number of output ends is equal to the number m of columns of sub-pixels included in the pixel 110. When m=2, the read-out circuit 1113 may include two output ends OUT1 and OUT2. An input end of the read-out circuit 1113 is connected to the FD region and is configured to enable the charges transferred into the FD region to be output via at least one of the plurality of output ends (such as the OUT1 and the OUT2). Specifically, the read-out circuit 1113 includes a reset transistor 11131, an amplification transistor (referred to as a follower transistor) 11132, and a selection transistor 11133. The reset transistor 11131 is connected to the FD region and is configured to reset the FD region. The amplification transistor 11132 is connected to the FD region and is configured to amplify the charges in the FD region to obtain amplified charges. The selection transistor 11133 is connected to the amplification transistor 11132 and is configured to read out the amplified charges to the output circuit.

For ease of illustration, in the following example, the pixel includes four sub-pixels arranged in a 2*2 array. Specifically, the pixel circuit may include four photoelectric conversion elements 1111, four transfer transistors 1112, an FD region, a reset transistor 11131, an amplification transistor 11132, and a selection transistor 11133. The pixel circuit 111 may further be configured with four exposure control lines configured to provide an exposure control signal. Each of the four exposure control lines may be correspondingly connected to a gate (TG1, TG2, TG3, and TG4) of one of the four transfer transistors 1112. When a pulse of an effective level (such as a VPIX level) is transmitted to the gate of the transfer transistor 1112 through the exposure control line, the transfer transistor 1112 is conducted, and the transfer transistor 1112 transfers the charges, which are photoelectrically converted by the photodiode, to the FD region.

A drain of the reset transistor 11131 is connected to a power supply VPIX of the pixel 110. A source of the reset transistor 11131 is connected to the FD region. Before the charges are transferred from the photodiode to the FD region, the pulse of the effective reset level is transmitted to the gate RG of the reset transistor 11131 via a reset line, and the reset transistor 11131 is conducted. The reset transistor 11131 resets the FD region to the power supply VPIX of the pixel 110.

The gate of the amplification transistor 11132 is connected to the FD region. The drain of the amplification transistor 11132 is connected to the power supply VPIX of the pixel 110. After the FD region is reset by the reset transistor 11131, the amplification transistor 11132 outputs, through the output end via the selector transistor 11133, a reset level and an analogue signal corresponding to the charges. After the charges of the photodiode are transferred by the transfer transistor 1112, the amplification transistor 11132 outputs, via the selection transistor 11133 through the output end, the analogue signal.

Each pixel circuit may be configured with two column control lines COL1 and COL2. A gate SEL of the selection transistor 11133 is configured to receive a selection control signal. A drain of the selection transistor 11133 is connected to the source of the amplification transistor 11132. The drain of the selection transistor 11133 may be arranged with two output ends OUT1 and OUT2. The two output ends OUT1 and OUT2 are in one-to-one connection with the two column control lines COL1 and COL2. Two output ends corresponding to the source of the selection transistor 11133 may be connected to the column processing unit 14 in FIG. 1 via the corresponding column control lines. When a pulse of the selection control signal is transmitted to the gate of the selection transistor 11133 via a selection line, the selection transistor 11133 is conducted. A signal output from the amplification transistor 11132 is transmitted to the column processing unit 14 through the selection transistor 11133.

When the exposure control signals TG received by the gates TG1, TG2, TG3, TG4 of the four transfer transistors 1112 enable the four transfer transistors 1112 to be conducted at the same time, the charges generated by the four photoelectric conversion elements 1111 are transferred to the corresponding FD regions respectively and are accumulated in the corresponding FD regions. When the exposure control signals TG received by the gate TG1 of the first transfer transistor and the gate TG3 of the third transfer transistor 1112 enable the corresponding first transfer transistor 1112 and the third transfer transistor 1112 to be conducted at the same time, the charges, which are generated by the first photoelectric conversion element 1111 connected to the first transfer transistor 1112 and the third photoelectric conversion element 1111 connected to the third transfer transistor 1112, are transferred to the corresponding FD regions and are accumulated in the FD regions.

It should be noted that a structure of the pixel 110 of the pixel circuit 111 in the present embodiment is not limited to the structure shown in FIG. 5. For example, the pixel circuit 111 may alternatively have a three-transistor pixel structure, and functions of the amplification transistor 11132 and the selection transistor 11133 may be performed one transistor.

Further, as shown in FIG. 4, the column processing unit 14 of FIG. 1 may include a plurality of first conversion circuits 141. The plurality of first conversion circuits 141 may be correspondingly connected to a plurality of output ends of the plurality of pixel circuits 112. Specifically, one first conversion circuit 141 includes a plurality of input ends. The plurality of input ends are in one-to-one connection with the plurality of output ends of one pixel circuit 112. The first conversion circuit 141 is configured to perform analogue-to-digital conversion on each analogue signal received by each of the plurality of input ends. The first conversion circuit 141 and the pixel circuit 111 read out the converted digital signal based on a full-resolution output mode or a primary merging output mode. For the full-resolution output mode, charges data in the pixel 110 are read out by taking a sub-pixel as a unit. That is, the first conversion circuit 141 and the pixel circuit 111 may independently output digital signals corresponding to charges generated by one photodiode in one pixel 110. For the primary merging output mode, the charges data in the pixel 110 are read out by taking the pixel 110 as a unit. That is, the first conversion circuit 141 and the pixel circuit 111 may sum and/or average digital signals of the charges generated by four photodiodes in one pixel 110 to output a combined signal.

In the present embodiment, the image sensor includes a pixel array and a plurality of first conversion circuits. The pixel array includes a plurality of pixels. Each pixel includes a plurality of sub-pixels arranged in a matrix. The plurality of sub-pixels in one pixel share one FD region. The pixel circuit of the pixel is configured to transfer charges generated by at least one photoelectric converter element in one pixel to the FD region, and the transferred charges are accumulated in the FD region. The pixel circuit of the pixel is configured to select, based on the accumulated charges, at least one output end of the pixel circuit to output the analogue signal corresponding to the charges in FD region. The first conversion circuit is configured to perform analogue-to-digital conversion on the analogue signals output from one pixel circuit. The first conversion circuit and the pixel circuit together read out the converted digital signals based on either the full resolution output mode or the primary merging output mode. For the full-resolution output mode, the digital signals are read out by taking the sub-pixel as a unit. For the primary merging output mode, the digital signals are read out by taking the pixel as a unit. That is, the image sensor in the above embodiment may provide various output modes. Exemplarily, when an image is to be formed in a dark scene, the primary merging output mode may be performed to achieve a merging output by taking the pixel as the unit, and an image having a high signal-to-noise ratio is obtained. When an image is to be formed in a bright scene, the full-resolution output mode may be performed to output signals independently, by taking the sub-pixel as the unit, such that an image having high resolution and a high signal-to-noise ratio is obtained.

In an embodiment, the primary merging output mode may include at least one of an additive mode, a digital averaging mode, and a combination mode.

The additive mode may be understood as accumulating charges of all sub-pixels of one pixel in the FD region, performing analogue-to-digital conversion on the accumulated charges, and read out the digital signals after the conversion.

The digital averaging mode may be understood as separately performing the analogue-to-digital conversion on charges that are generated at different time points by each sub-pixel of one pixel, averaging the converted digital signals, and reading out the averaged digital signal.

The combination mode may be understood as: accumulating first charges generated by a first portion of sub-pixels of one pixel in the FD region to generate a first analogue signal, performing analogue-to-digital conversion on the first analogue signal to output a first digital signal; and accumulating, at different time points, second charges generated by a second portion of sub-pixels of the one pixel in the FD region to generate a second analogue signal, averaging the first digital signal and the second digital signal, and reading out an averaged signal. The first portion of sub-pixels and the second portion of sub-pixels cooperatively form the one pixel.

Specifically, when the charges accumulated in the FD region within a same exposure duration are charge of one photoconverting element 1111, the pixel circuit 111 conducts all output ends to output the analogue signals corresponding to the charges of all of the plurality of photoconverting elements 1111 at different time points to the first conversion circuit 141, allowing the first conversion circuit 141 to perform the full resolution output mode or the digital averaging mode on the output analogue signals. The outputting at different time points may be understood as the charges, which are accumulated by different photoelectric conversion elements 1111 within different exposure durations, being output at different time points. Exemplarily, charges, which are accumulated by the photoelectric conversion element 111 within a first exposure duration, may be output at a first time point; and charges, which are accumulated by the photoelectric conversion element 111 within a second exposure duration, may be output at a second time point. The first time point and the second time point are different time points.

When charges, which are accumulated in the FD region within the same exposure duration, are from all photoelectric conversion elements 1111 of one pixel 110, the pixel circuit 111 conducts any one output end to output analogue signals corresponding to the accumulated charges to the first conversion circuit 141, allowing the first conversion circuit 141 to perform the additive mode on the analogue signals.

When the charges, which are accumulated in the FD region within a first exposure duration, are first accumulated charges accumulated from the photoelectric conversion elements 1111 corresponding to the first portion of sub-pixels, or, when the charges, which are accumulated in the FD region within a second exposure duration, are second accumulated charges accumulated from the photoelectric conversion elements 1111 corresponding to the second portion of sub-pixels, the pixel circuit 111 conducts the plurality of output ends to output, at different time points, the analogue signal corresponding to the first accumulated charges and the analogue signal corresponding to the second accumulated charges to the first conversion circuit 141, allowing the first conversion circuit 141 to perform the combination mode on the analogue signals. Exemplarily, when the pixel 111 includes two columns of sub-pixels, the first portion of sub-pixels include sub-pixels located in a first column, and the second portion of sub-pixels include sub-pixels located in the second column.

Figure 6:
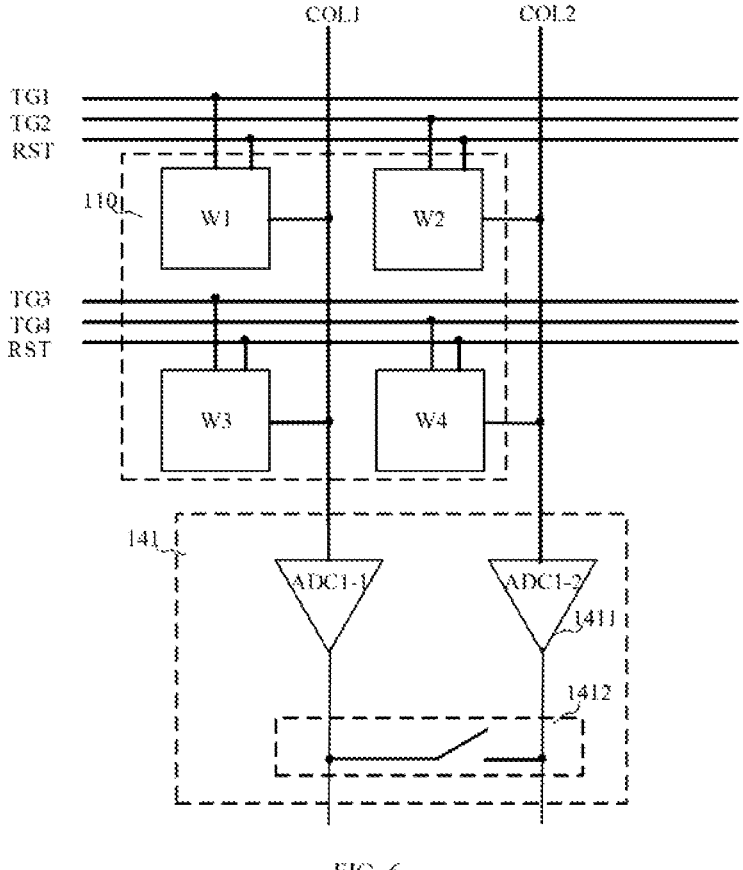
FIG. 6 is a schematic view of a first conversion circuit of the pixel according to an embodiment of the present disclosure.
Figure 7:
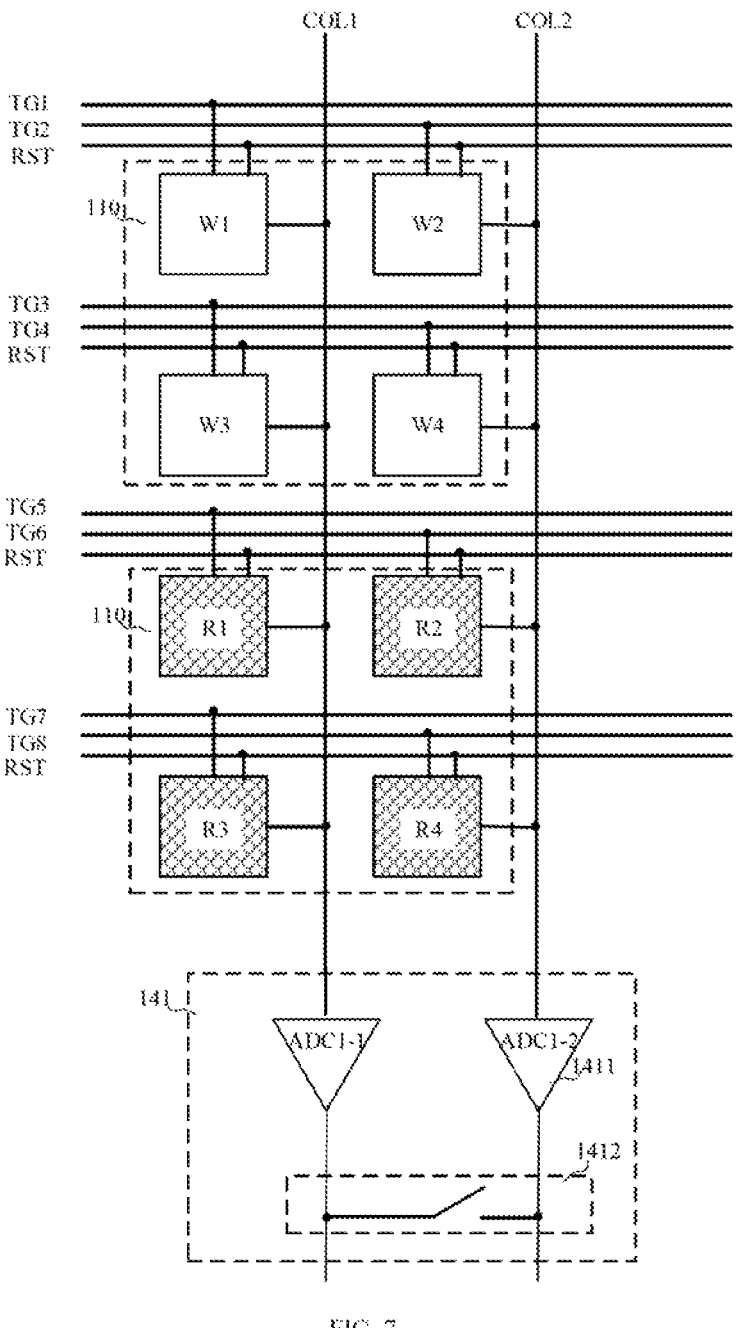
FIG. 7 is a schematic view of two pixels sharing one first conversion circuit according to an embodiment of the present disclosure.
Figure 8:
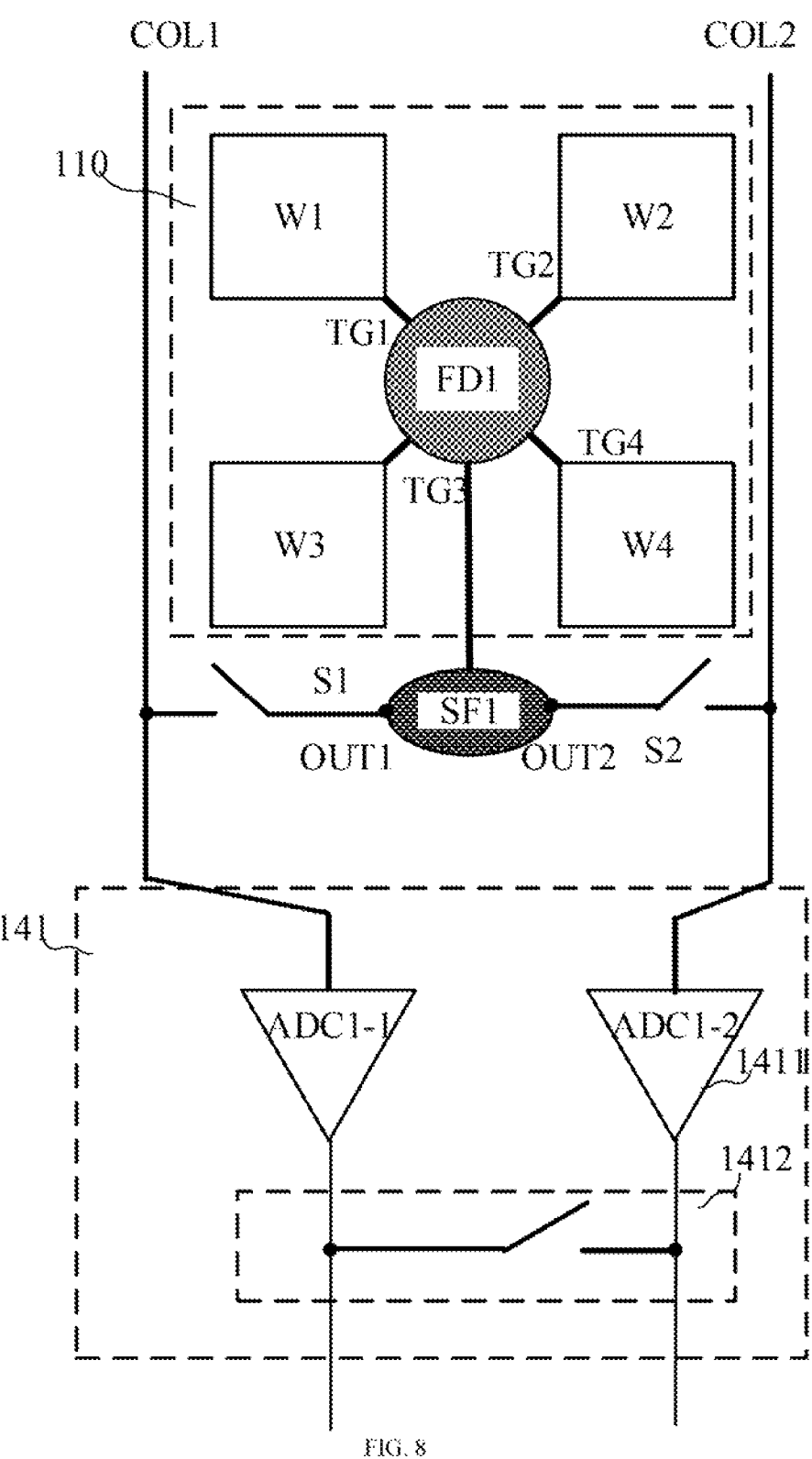
FIG. 8 to FIG. 10 are schematic views showing operation principles of pixels operating based on the first conversion circuit according to some embodiments of the present disclosure.

As shown in FIG. 6 to FIG. 8, in an embodiment, the first conversion circuit 141 includes: m first conversion units 1411 and a first switching unit 1412. The m first conversion units 1411 are in one-to-one connection with the m column control lines (such as the COL1 and the COL2). Each of the m first conversion units is configured to convert the received analogue signal into a digital signal. That is, the number of first conversion units 1411 is equal to the number of columns of sub-pixels in the same pixel 110. Sub-pixels in one column of one pixel 110 may share a common first conversion unit 1411. Specifically, the first conversion units 1411 may include an analogue-to-digital converter. Each analogue-to-digital converter may be correspondingly connected to one column control line to convert the analogue signal output from the pixel circuit 111 into the digital signal.

The first switching unit 1412 is connected to each first conversion unit 1411. When the first switching unit 1412 is conducted, the first conversion circuit 141 performs an averaging operation on the m digital signals. Each digital signal may be a digital signal corresponding to the charges generated by one photoelectric conversion element 1111, or may be a digital signal corresponding to corresponding to the charges, which are generated by a plurality of photoelectric conversion elements 1111 located in one column of one pixel 110 and are accumulated in the FD region. When the first switching unit 1412 is disconnected, the first conversion circuit 141 may output the m digital signals at different time points, such that the full-resolution output mode may be performed.

For the purpose of illustration, an operation principle of the full-resolution output mode and an operation principle of the primary merging output mode will be described in the following embodiments, each pixel 110 includes four sub-pixels W1-W4; the four sub-pixels are arranged in a 2*2 matrix; and the pixel 110 is configured with: four exposure control lines TG1, TG2, TG3, and TG4, two reset control lines RST, a first column control line COL1, and a second column control line COL2; and each pixel 110 unit is configured with a first output end OUT1 and a second output end OUT2. Specifically, the first output terminal OUT1 is connected to the first conversion circuit 141 via a first switch S1 and the first column control line COL1, such that a first output path is formed. The second output terminal OUT2 is connected to the first conversion circuit 141 via a second switch S2 and the second column control line COL2, such that a second output path is formed.

For the full-resolution output mode, within the first exposure duration, the first exposure control line TG1 inputs a high voltage level, a transfer transistor of the corresponding sub-pixel W1 is turned on, charges generated by the corresponding sub-pixel W1 are transferred to the corresponding FD region FD1. Subsequently, the exposure control line TG1 inputs a low voltage level, the transfer transistor of the corresponding sub-pixel W1 is disconnected, the charges in the FD region FD1 are converted into an analogue signal (also referred to as an analogue voltage signal) by an amplification transistor SF1. At the same time, by controlling the first switch S1 to be closed and the second switch S2 to be disconnected, the analogue signal is input to the analogue-to-digital converter ADC1-1 via the first column control line COL1, the analogue-to-digital converter ADC1-1 performs the analogue-to-digital conversion on the analogue signal, and a digital signal corresponding to the sub-pixel W1 is output. Accordingly, after the reset transistor is reset at the high voltage level, the charges in the FD region FD1 are cleared. The exposure control line TG1 may be controlled to input, within a second exposure duration, a low voltage level signal, and charges generated by the sub-pixel W2 may be transferred into the FD region FD1. The analogue signal corresponding to the charges generated by the sub-pixel W2 may be input to the analogue-to-digital converter ADC1-2 via the second column control line COL2 by controlling the on/off of the first switch S1 and the second switch S2. The analogue-to-digital converter ADC1-2 may perform analogue-to-digital conversion on the input analogue signal, and a digital signal corresponding to the sub-pixel W2 is output. A read-out process of the sub-pixel W3 may be referred to the read-out process of the sub-pixel W1, and a read-out process of the sub-pixel W4 may be referred to the read-out process of the sub-pixel W2, which will not be repeated herein. In the full-resolution output mode, after a previous sub-pixel is read out, a next sub-pixel must be read out after the stored charges in the current FD region are cleared.

For the additive mode in the primary merging output mode, the four exposure control lines TG1, TG2, TG3, TG4 input high voltage levels at the same time, and at this time, transfer transistors of the four sub-pixels W1, W2, W3, W4 are conducted at the same time, and charges in the four sub-pixels W1, W2, W3, W4 are converged to the common FD region FD1. Furthermore, the four exposure control lines TG1, TG2, TG3, and TG4 simultaneously input low voltage levels, and at this time, the transfer transistors of the four sub-pixels W1, W2, W3, and W4 are turned off, and the charges, which come from the four sub-pixels W1, W2, W3, and W4 and are stored in the FD region FD1, are added up and are converted by the amplification transistor SF1 into an analogue signal. By controlling the first switch S1 to be closed and the first switch S2 to be disconnected, the analogue signal is input to the analogue-to-digital converter ADC1-1 through the first column control line COL1, the analogue-to-digital converter ADC1-1 performs analogue-to-digital conversion on the analogue signal to output a digital signal corresponding to the charges, which come from the four sub-pixels W1, W2, W3, and W4 and are accumulated in the FD region FD1.

For the combination mode in the primary merging output mode, the two exposure control lines TG1 and TG3 input high voltage levels at the same time, and at this time, transfer transistors of the two sub-pixels W1 and W3 are turned on, charges of the sub-pixels W1 and W3 are accumulated to the FD region FD1. After a period of time, low voltage levels are input to gates of the transfer transistors of the two sub-pixels W1 and W3 at the same time, the transfer transistors of the two sub-pixels W1 and W3 are disconnected. At this time, by controlling the first switch S1 to be closed and the second switch S2 to be disconnected, the accumulated charges in the FD regions FD1 are transferred to the analogue-to-digital converter ADC1-1 through the amplification transistor SF and the first column control line COL1. The analogue-to-digital converter ADC1-1 performs analogue-to-digital conversion to output the first digital signal corresponding to the accumulated charges of the two sub-pixels W1 and W3. After the reset transistor is reset at the high voltage level, the accumulated charges in the FD region FD1 are cleared, and the two exposure control lines TG2 and TG4 input high voltage levels at the same time. At this time, the transfer transistors of the two sub-pixels W2 and W4 are disconnected, and the charges generated by the two sub-pixels W2 and W4 are accumulated to the FD region FD1. After a period of time, the two exposure control lines TG2 and TG4 input low voltage levels at the same time, the transfer transistors of the two sub-pixels W2 and W4 are disconnected. At this time, by controlling the second switch S2 to be closed and the first switch S1 to be disconnected, signals of the accumulated charges in the FD region FD1 are transferred to the analogue-to-digital converter ADC1-2 through the amplification transistor SF1 and the second column control line COL2. The analogue-to-digital converter ADC1-2 performs analogue-to-digital conversion on the signals to output a second digital signal accumulated from the two sub-pixels W2 and W4. Specifically, when the first switching unit 1412 is closed and conducted, the two analogue-to-digital converters ADC1-1 and ADC1-2 are connected to each other, and the averaging operation may be performed on the first digital signal output from the analogue-to-digital converter ADC1-1 and the second digital signal output from the analogue-to-digital converter ADC1-2.

Figure 9:
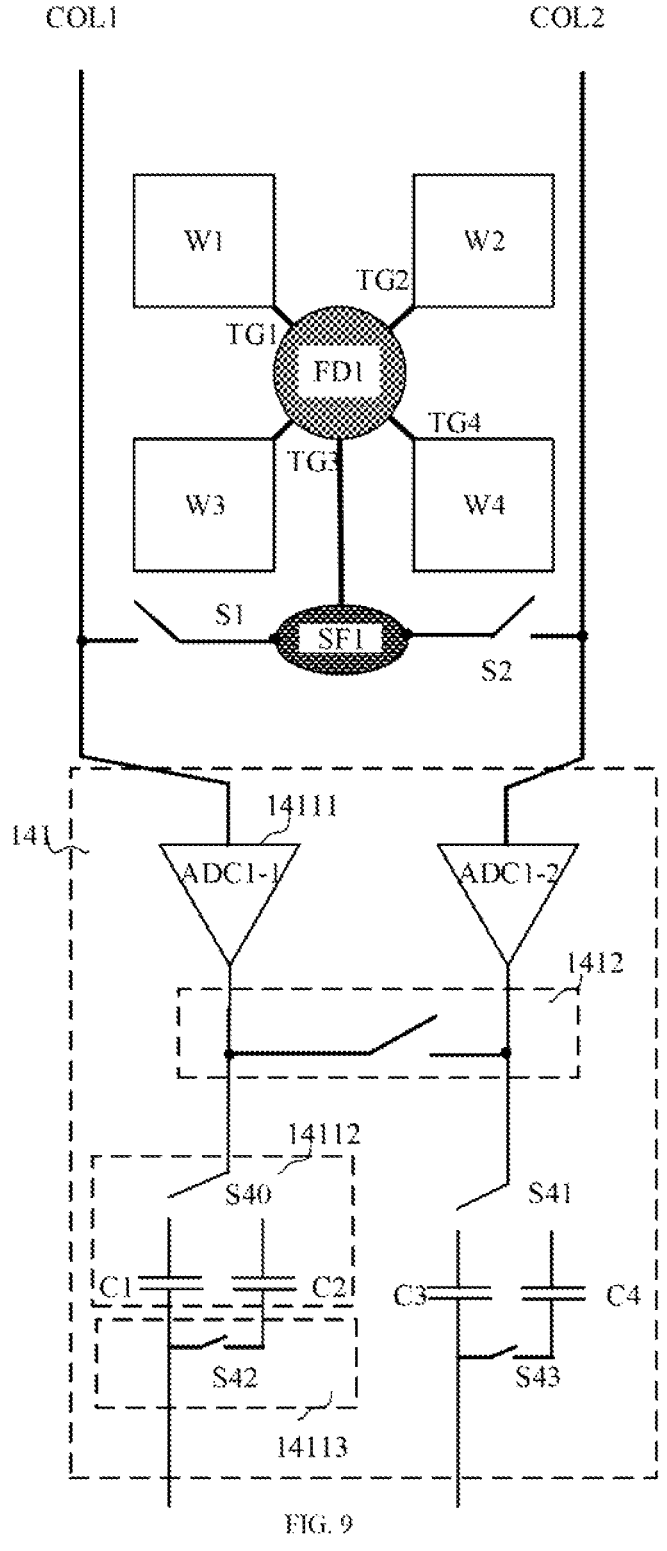

As shown in FIG. 9, in an embodiment, the first conversion unit includes: an analogue-to-digital converter 14111, a storage unit 14112, and a second switching unit 14113. The analogue-to-digital converter 14111 is connected to the column control line and is configured to perform analogue-to-digital conversion on the received analogue signal to output the digital signal. The storage unit 1411 is connected to the first switching unit 1412 and is configured to store digital signals corresponding to pixels 110 located in one column into various sections. Specifically, the storage unit 1411 stores charges generated by each sub-pixel into various sections. Specifically, the storage unit 1411 may include n storage capacitors C1 and C2. The second switching unit 14113 is connected to each of the n storage capacitors in the storage unit 1411 respectively to perform the averaging operation on the digital signals stored in the various sections.

When m=n=2, the storage unit includes a first capacitor C1 and a second capacitor C2. The second switching unit includes a first switch S40 and a second switch S42. A first end of the first switch S40 is connected to the output end of the analogue-to-digital converter, and two second ends of the first switch S40 are connected to a first end of the first capacitor and a first end of the second capacitor, respectively. The second switch S42 is connected between a second end of the first capacitor C1 and a second end of the second capacitor C2.

As shown in FIG. 9, the operation principle of the digital averaging mode in the primary merging output mode is as follows.

Within the first exposure duration, the charges generated by the sub-pixel W1 are transferred the corresponding FD region FD1, and the charges in the FD region FD1 are converted into an analogue signal by the amplification transistor SF1. At the same time, the first switch S1 is controlled to be closed and the second switch S2 is controlled to be disconnected, the analogue signal is input into the analogue-to-digital converter ADC1-1 via the first column control line COL1. By controlling the switch S40 in the storage unit to be turned on, the digital signal, which is output after the analogue-to-digital converter ADC1-1 performing the analogue-to-digital conversion on the analogue signal, may be transferred to and stored in the storage capacitor C1. Accordingly, after the reset transistor is reset at the high voltage level, the charges in the FD region FD1 are cleared. Within the second exposure duration, an analogue signal corresponding to the charges generated by the sub-pixel W2 may be input into the analogue-to-digital converter ADC1-2. By controlling the switch S41 in the storage unit to be conductive, the analogue-to-digital converter ADC1-2 performs the analogue-to-digital conversion on the analogue signal to output a digital signal corresponding to the sub-pixel W2, and the digital signal is output to and stored in the storage capacitor C3. Accordingly, a digital signal corresponding to the charges generated by the sub-pixel W3 may be transferred to and stored in the storage capacitor C2, and a digital signal corresponding to the charges generated by the sub-pixel W4 may be transferred to and stored in the storage capacitor C4. Further, the first switch S4 and the first switch S43 in the second switching unit 14113 are turned on to average the four digital signals corresponding to the four sub-pixels W1, W2, W3, W4 and output an averaged digital signal. In the full-resolution output mode, after the charges of the previous sub-pixel are read out, charges of a next sub-pixel may be read out only after the stored charges in the current FD region FD1 are cleared.

Figure 10:
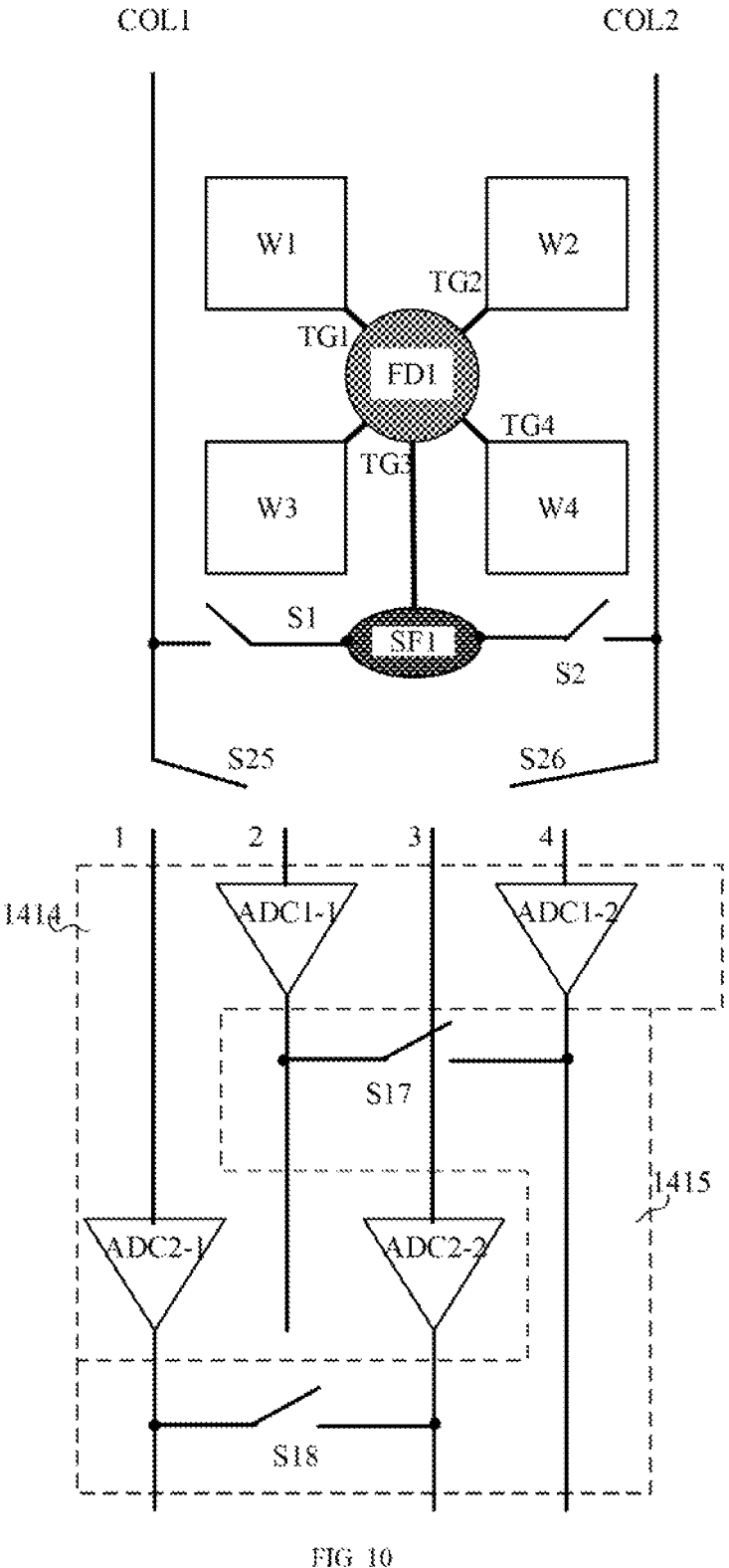

As shown in FIG. 10, in an embodiment, the first conversion circuit 141 may include a second conversion unit 1414, a first sub-switch S17, and a second sub-switch S18. The second conversion unit 1414 may include n*m analogue-to-digital converters. Exemplarily, when n=m=2, the second conversion unit 1414 may include four analogue-to-digital converters ADC1-1, ADC1-2, ADC2-1, and ADC2-2. The first column of control lines COL1 may be connected to the analogue-to-digital converters ADC1-1 and ADC2-1 via the third sub-switch S25. The second column of control lines COL2 may be connected to the analogue-to-digital converters ADC1-2 and ADC2-2 via the fourth sub-switch S26. Specifically, the first sub-switch S17 may be connected between the analogue-to-digital converters ADC1-1 and ADC1-2, the second sub-switch S18 may be connected between the analogue-to-digital converters ADC2-1 and ADC2-2, and a fifth sub-switch (not shown in the drawings) may be connected between the ADC1-1 and the ADC2-2.

For the digital averaging mode in the primary merging output mode, the exposure control line TG1 inputs a high voltage level to turn on the transfer transistor of the sub-pixel W1. The charges generated by the sub-pixel W1 are transferred to the FD region FD1. The charges, after passing through the amplification transistor SF1, are transformed into an analogue signal. When the first column control line COL1 and the switch S25 are conducted with a contact 1, the analogue signal is transferred to and read out from the analogue-to-digital converter ADC1-1. After the reset transistor is reset, the exposure control line TG2 inputs a high voltage level to enable the transfer transistor of the sub-pixel W2 to be conducted. The charges generated by the sub-pixel W2 are transferred to the FD region FD1 and are converted, after passing through the amplification transistor SF1, into an analogue signal. When the first column control line COL1 and the switch S25 are connected to a contact 2, the analogue signal is transferred to and read out from the analogue-to-digital converter ADC2-1. After the reset transistor is reset, the exposure control line TG3 inputs a high voltage level to enable the transfer transistor of the sub-pixel W3 to be conducted. The charges generated by the sub-pixel W3 are transferred to the FD region FD1 and are converted, after passing through the amplification transistor SF1, into an analogue signal. When the second column control line COL2 and the switch S26 are connected to a contact 4, the analogue signal is transferred to and read out from the analogue-to-digital converter ADC1-2. After the reset transistor is reset, the exposure control line TG4 inputs a high voltage level to enable the transfer transistor of the sub-pixel W4 to be conducted. The charges generated by the sub-pixel W4 are transferred to the FD region FD1 and are converted, after passing through the amplification transistor SF1, into an analogue signal. When the second column control line COL2 and the switch S26 are connected to a contact 3, the analogue signal is transferred to and read out from the analogue-to-digital converter ADC2-2. Further, the switches S17 and S18 are conducted to enable the digital signals read out from the analogue-to-digital converters ADC1-1 and ADC1-2 are averaged for a first time to output a first average digital signal. The digital signals read out from the analogue-to-digital converters ADC2-1 and ADC2-2 are averaged for a first time to output a second average digital signal. Further, a second averaging operation is performed on the first average digital signal and the second average digital signal to output an average digital signal taking the pixel 110 as a unit. To be noted that the first conversion circuit 141 in the present embodiment may enable the reading out operation in any of the full-resolution output mode and the primary merging output mode to be achieved. When the full-resolution output mode, the additive mode, and the combination mode are supported, the analogue-to-digital converter involved in the reading out operation may include the analogue-to-digital converters ADC1-1 and ADC1-2. The specific reading out operation may be referred to in the above embodiments and will not be repeated herein.

In the present embodiment, by configuring four analogue-to-digital converters, the image sensor may be provided to perform an efficiency of the digital averaging mode. In addition, the four analogue-to-digital converters may be multiplexed with analogue-to-digital converters of first conversion circuits 141 of other pixels 110 in the pixel array. The multiplexing process may be described in the following embodiments.

Figure 11:
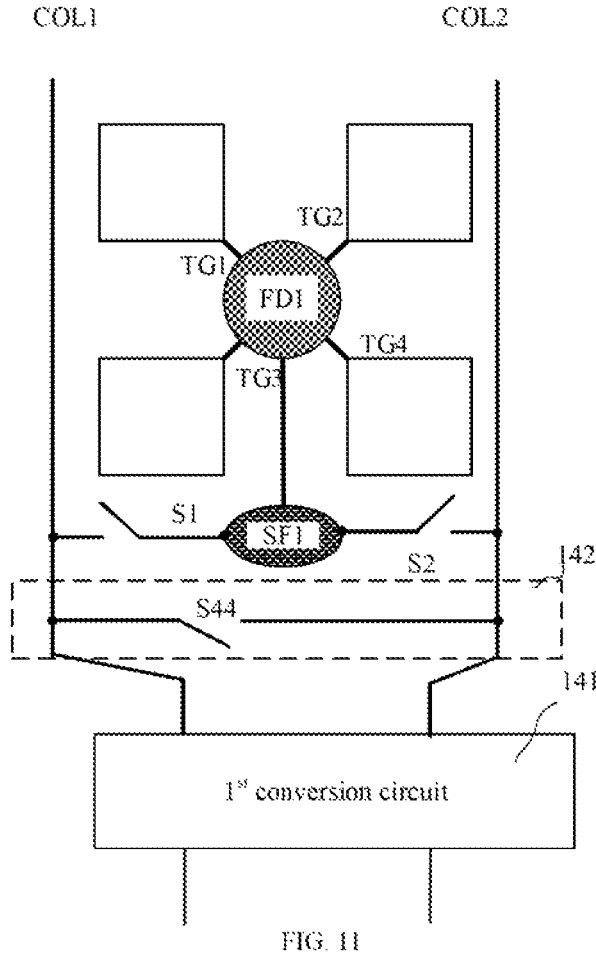
FIG. 11 is a second conversion circuit of the pixel according to an embodiment of the present disclosure.

As shown in FIG. 11, in an embodiment, the primary merging output mode includes an analogue averaging mode. Specifically, the image sensor further includes a second conversion circuit 142 corresponding to each pixel. The second conversion circuit 142 is arranged between the output end of the pixel circuit 111 and the input end of the first conversion circuit 141. That is, the second conversion circuit 142 is connected to the plurality of output ends of the pixel circuit 111 and the input end of the first conversion circuit 141. The second conversion circuit 142 is configured to perform an operation of the analogue averaging mode on the plurality of analogue signals output by the pixel circuit 111. Specifically, the second conversion circuit may include a switch S44 connected between the first column control line COL1 and the second column control line COL2. The second conversion circuit 142 may average the analogue signals transmitted on the first column control line COL1 and the second column control line COL2. The analogue signals may be analogue signals corresponding to the charges generated by any sub-pixel in one pixel 110, or may be analogue signals corresponding to the charges, which are generated by a plurality of sub-pixels located in one column of one pixel 110 and are cumulated in the FD region.

In the present embodiment, by arranging the second conversion circuit 142, the plurality of analogue signals output from the pixel circuit 111 may be averaged, output modes of the charges generated by each pixel 110 may be expanded, such that the image sensor may be applicable for more scenarios.

Figure 12:
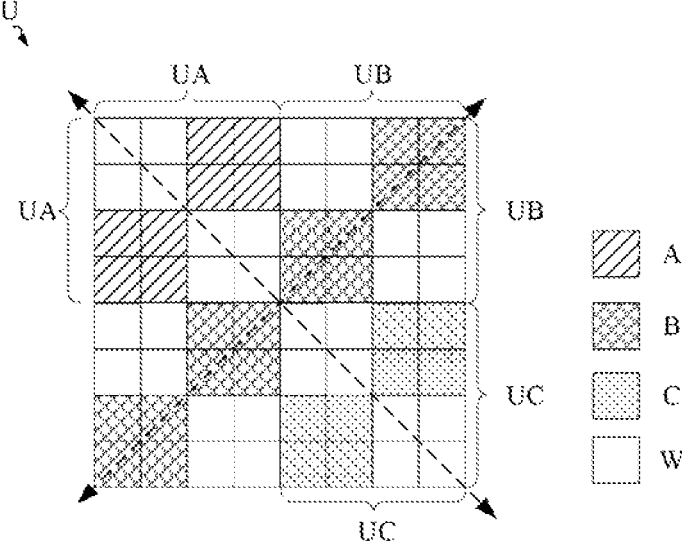
FIG. 12 is a schematic view of a minimum repeating unit in the pixel array according to an embodiment of the present disclosure.

FIG. 12 is a schematic view of arrangement of pixels in a pixel array according to some embodiments of the present disclosure. The pixels 110 includes two types, one of the two types is a full-colour pixel W, and the other one of the two types is coloured pixel. The coloured pixel has a narrower spectral response than the full-colour pixel. Specifically, the full-colour pixel may include a plurality of full-colour sub-pixels W. The coloured pixel may include a plurality of sub-pixels having a same single colour.

In a minimum repeating unit, a plurality of duplications are arranged in a row and in a column, such that the pixel array 11 is formed. Each minimum repeating unit includes a plurality of full colour pixels W and a plurality of coloured pixels. Each minimum repeating unit includes a plurality of pixel units U. Each pixel unit U includes a plurality of single colour pixels and a plurality of full-colour pixels W.

Specifically, FIG. 12 shows a schematic view of arrangement of pixels in the minimum repeating unit according to an embodiment of the present disclosure. The minimum repeating unit has 16 pixels arranged in 4 rows and 4 columns. The pixel unit U has 4 pixels arranged in 2 rows and 2 columns. The arrangement is as follows:

W A W B
A W B W
W B W C
B W C W

The W represents the full colour pixel; the A represents a first colour pixel of the plurality of coloured pixels; the B represents a second colour pixel of the plurality of coloured pixels; and the C represents a third colour pixel of the plurality of coloured pixels.

For each pixel unit U, the full-colour pixel W and the single colour pixel are arranged alternately.

As shown in FIG. 12, the pixel units U includes three classes. A first class of pixel units UA includes a plurality of full-colour pixels W and a plurality of first-colour pixels A. A second class of pixel units UB includes a plurality of full-colour pixels W and a plurality of second-colour pixels B. A third class of pixel units UC includes a plurality of full-colour pixels W and a plurality of third-colour pixels C. Each minimum repeating unit includes four pixel units U: one first class of pixel units UA, two second classes of pixel units UB, and one third class of pixel units UC. The one first class of pixel units UA and the one third class of pixel units UC are disposed in a first diagonal direction D1 (such as a direction connecting from an upper left corner to a lower right corner in FIG. 12). The two second classes of pixel units UB are disposed in a second diagonal direction D2 (such as a direction connecting from an upper right corner to a lower left corner in FIG. 12). The first diagonal direction D1 is different from the second diagonal direction D2. For example, the first diagonal is perpendicular to the second diagonal. Exemplarily, in the minimum repeating unit, the first-colour pixel A may be a red pixel R; the second-colour pixel B may be a green pixel G; and the third-colour pixel C may be a blue pixel Bu.

Figure 13:
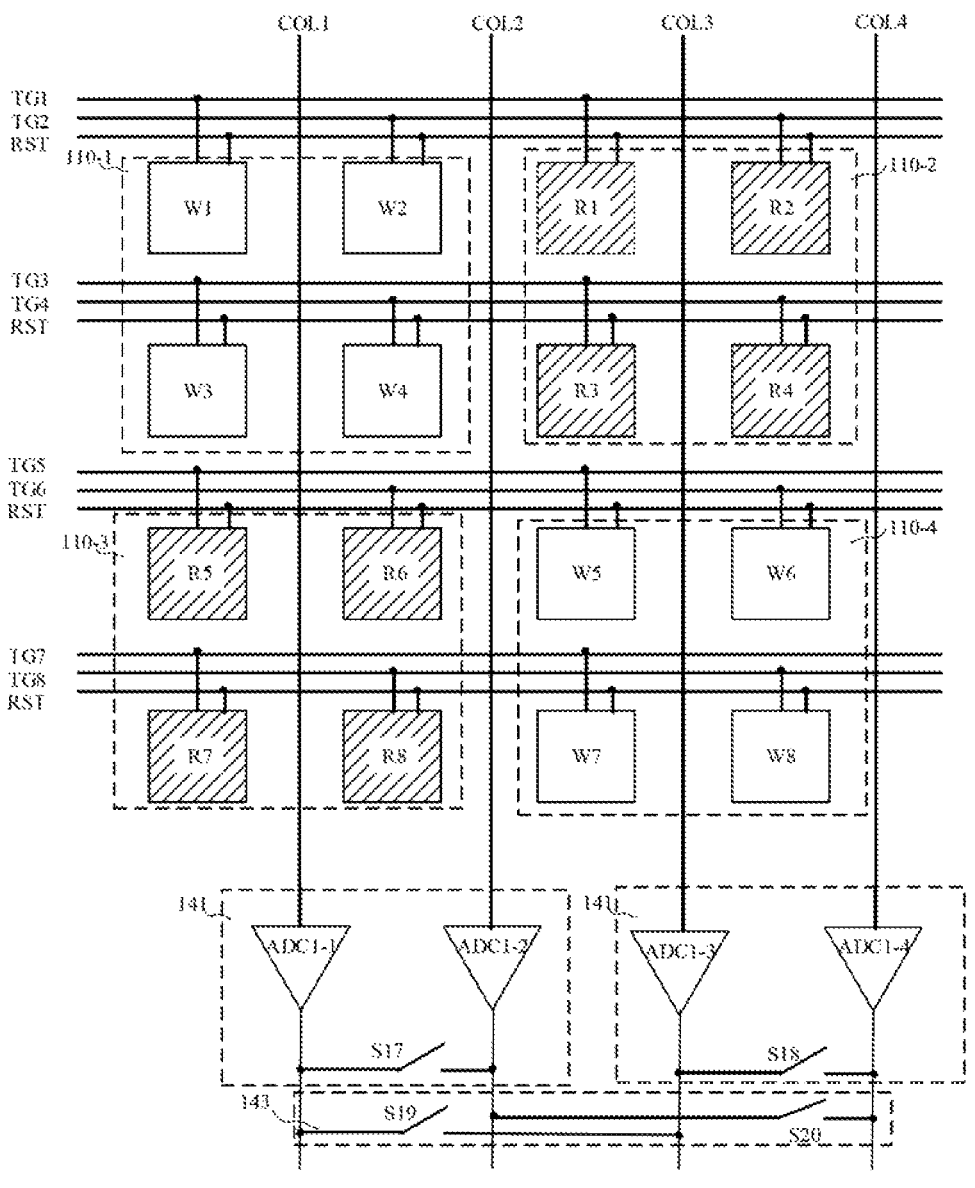
FIG. 13 is a schematic view of a circuit of a pixel array according to an embodiment of the present disclosure.
Figure 14:
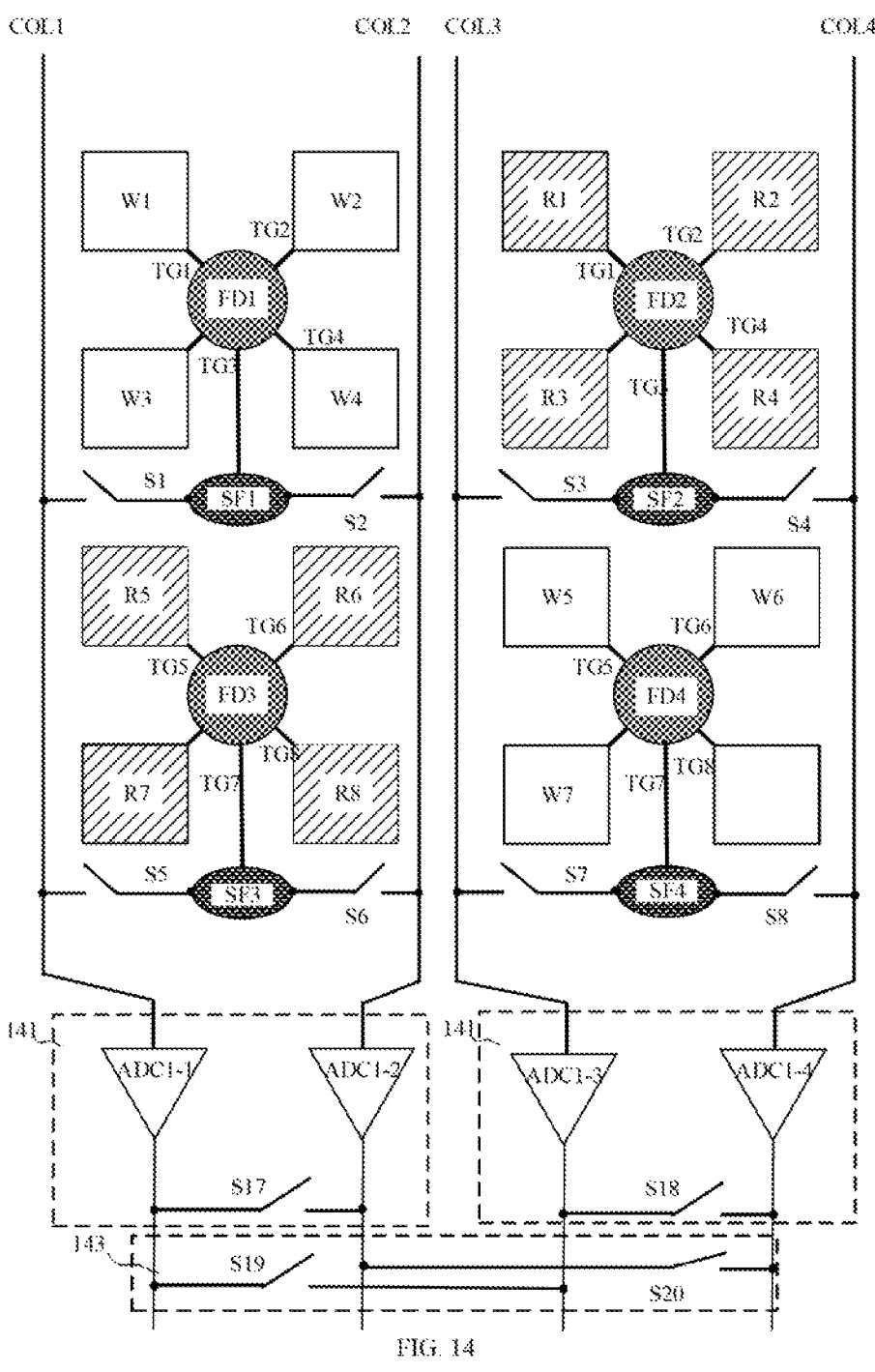
FIG. 14 and FIG. 15 are schematic views showing operation principles of pixel units operating based on the first conversion circuit according to some embodiments of the present disclosure.

As shown in FIG. 13 and FIG. 14, for convenience of illustration, the following embodiments will be illustrated based on the first class of pixel units UA. The first class of pixel units UA may include a first pixel 110-1, a second pixel 110-2, a third pixel 110-3, and a fourth pixel 110-4, arranged in a 2*2 array. The first pixel 110-1 and the fourth pixel 110-4 are full-colour pixels and are disposed in the first diagonal direction. The second pixel 110-2 and the third pixel 110-3 are coloured pixels and are disposed in the second diagonal direction.

To be noted that, in other embodiments, the first diagonal direction D1 may alternatively be a direction connecting from the upper right corner to the lower left corner, and the second diagonal direction D2 may alternatively be a direction connecting from the upper left corner to the lower right corner. In addition, the "direction" here may not orientate towards one direction, but may be interpreted as a "straight line" indicating the arrangement and may orientate two directions at both ends of the straight line.

The first class of pixel units UA may correspondingly include two first conversion circuits 141. Two pixels 110 located in one column may share one of the two first conversion circuits 141. First conversion circuits 141 of two pixels 110 located in one row are connected to each other. That is, the first pixel 110-1 and the third pixel 110-3 may share one first conversion circuit 141, the second pixel 110-2 and the fourth pixel 110-4 may share another first conversion circuit 141, an output end of the first conversion circuit 141 is electrically connected to an output end of the another first conversion circuit 141. When the two first conversion circuits are electrically connected to each other, the two first conversion circuits 141, which are connected to each other, are further configured to read out digital signals based on a secondary merging output mode. The secondary merging output mode is configured to read out digital signals by taking all pixels in the first diagonal as a unit or taking all pixels in the second diagonal as a unit. That is, for the secondary merging output mode, the primary merging output mode is performed on the first pixel 110-1 to output a first digital signal; the primary merging output mode is performed on the third pixel 110-3 to output a third digital signal; and an averaging operation is performed on the first digital signal and the fourth digital signal to read out a digital average signal of all pixels 110 located on the first diagonal direction. Further, the primary merging output mode is performed on the second pixel 110-2 to output a second digital signal; the primary merging output mode is performed on the fourth pixel 110-4 to output a fourth digital signal; and an averaging operation is performed on the second digital signal and the fourth digital signal to read out a digital average signal of all pixels 110 located on the second diagonal direction.

In an embodiment, the pixel unit U is configured with a first column control line COL1, a second column control line COL2, a third column control line COL3, and a fourth column control line COL4. The pixel unit U further includes a third switching unit 143 disposed at the output ends of the two first conversion circuits 141. The third switching unit 143 includes a third switch S19 and a fourth switch S20. The third switch S19 is connected between the first column control line COL1 and the third column control line COL3. The fourth switch S20 is connected between the second column control line COL2 and the fourth column control line COL4.

Specifically, first output ends of all pixels located in the first column are all connected to the first column control line COL1 via switches (such as the switch S1 and a switch S5); and second output ends of all pixels located in the first column are all connected to the second column control line COL2 via switches (such as the switch S2 and a switch S6). First output ends of all pixels located in the second column are all connected to the third column control line COL3 via switches (such as the switch S3 and a switch S7); and second output ends of all pixels located in the second column are all connected to the fourth column control line COL4 via switches (such as the switch S4 and a switch S8).

The two first conversion circuits 141 of one pixel unit U include: four analogue-to-digital converters ADC1-1, ADC1-2, ADC1-3, and ADC1-4; and two fifth switches (such as a switch S17 and a switch S18) disposed at output ends of the analogue-to-digital converters 14111. An input end of each of the four analogue-to-digital converters 14111 is connected to one of the four column control lines. One of the two fifth switches (such as the switch S17) is connected between the first column control line COL1 and the second column control line COL2. The other one of the two fifth switches (such as the switch S18) is connected between the third column control line COL3 and the fourth column control line COL4.

For the ease of illustration, operation principles of the full-resolution output mode, the primary merging output mode, and the secondary merging output mode will be explained by taking the image sensor shown in FIG. 13 and FIG. 14 as an example. The pixel unit is arranged with exposure control lines TG1-TG8 for transmitting exposure control signals; a plurality of reset control lines RST for transmitting reset control signals; and a plurality of column control lines COL1-COL4. Each of the plurality of column control lines may be connected to one first conversion circuit 141 correspondingly.

For the full-resolution output mode, each of the exposure control lines TG1 and TG5 inputs a high voltage level, the transfer transistors of the sub-pixels W1, R1, R5, and W5 corresponding to the exposure control lines TG1 and TG5 are conducted. Charges generated by the sub-pixel W1 are transferred to a FD region corresponding to the sub-pixel W1; charges generated by the sub-pixel R1 are transferred to a FD region corresponding to the sub-pixel R1; charges generated by the sub-pixel R5 are transferred to a FD region corresponding to the sub-pixel R5; charges generated by the sub-pixel W5 are transferred to a FD region corresponding to the sub-pixel W5. Further, each of the exposure control lines TG1 and TG5 inputs a low voltage level, the transfer transistors of the sub-pixels W1, R1, R5, and W5 corresponding to the exposure control lines TG1 and TG5 are disconnected, the switches S1, S3, S6, and S8 are closed, and the switches S2, S4, S5, S7, and S17-S20 are disconnected. The charges of the sub-pixel W1 transferred to the FD region FD1 are converted into an analogue signal by the amplification transistor SF1, the analogue signal is input into the analogue-to-digital converter ADC1-1 via the column control line COL1. The charges of the sub-pixel R1 transferred to the FD region FD2 are converted into an analogue signal by the amplification transistor SF2, the analogue signal is input into the analogue-to-digital converter ADC1-3 via the column control line COL3. The charges of the sub-pixel R5 transferred to the FD region FD3 are converted into an analogue signal by the amplification transistor SF3, the analogue signal is input into the analogue-to-digital converter ADC1-2 via the column control line COL2. The charges of the sub-pixel W5 pixel 110 transferred to the FD region FD4 are converted into an analogue signal by the amplification transistor SF4, the analogue signal is input into the analogue-to-digital converter ADC1-4 via the column control line COL4. In this way, a digital signal corresponding to the charges generated by each of the sub-pixels W1, R1, R5, and W5 is read out. Each of the exposure control lines TG1 and TG5 inputs a high voltage level, similar to the process of reading out signals of the sub-pixels W1, R1, R5, and W5, the digital signals corresponding to the charges generated by the sub-pixels W2, R2, R6, and W6 may be read out. In this way, the digital signal corresponding to the charges generated by each sub-pixel of the pixel unit U may be correspondingly read out. In this process, the switches S17 and S18 in the first conversion circuit 141 and the switches S19 and S20 of the third switching unit 143 are disconnected.

For the additive mode in the primary merging output mode, the exposure control lines TG1, TG2, TG3, and TG4 input high voltage levels at the same time, the transfer transistors corresponding to the sub-pixels W1, W2, W3, W4, R1, R2, R3, and R4 are turned on. The charges of the four sub-pixels W1, W2, W3, and W4 are transferred into the shared FD region FD1; and the charges of the four sub-pixels R1, R2, and R3, R4 are transferred into the shared FD region FD2. Further, the exposure control lines TG1, TG2, TG3, and TG4 simultaneously input a low voltage level, the transfer transistors corresponding to the sub-pixels W1, W2, W3, W4, R1, R2, R3, and R4 are disconnected. The charges, which are generated by the four sub-pixels W1, W2, W3, and W4 and are accumulated in the FD region FD1, are added together to form a first charge. The first charge is converted, after passing through the amplification transistor SF1, to an analogue signal. Further, by controlling the switch S1 to be closed and controlling the switch S2 to be disconnected, the analogue signal is output to the analogue-to-digital converter ADC1-1 via the column control line COL1. The charges generated by the four sub-pixels R1, R2, R3, and R4 are accumulated in the FD region FD2 and are added together to form a second charge. The second charge is converted, after passing through the amplification transistor SF2, to an analogue signal. Further, by controlling the switch S3 to be closed and controlling the switch S4 to be disconnected, the analogue signal is output to the analogue-to-digital converter ADC1-3 via the column control line COL3. In the above process, the switches S17 and S18 in the first conversion circuit 141 and the switches S19 and S20 of the third switching unit 143 are disconnected.

When the exposure control lines TG1, TG2, TG3, and TG4 input high voltage levels, the exposure control lines TG5, TG5, TG7, and TG8 may also be controlled to input high voltage levels at the same time. The transfer transistors corresponding to the sub-pixels R5, R6, R7, R8, W5, W6, W7, and W8 are turned on. The charges of the four sub-pixels R5, R6, R7, and R8 are transferred into the shared FD region FD3, and the charges of the four sub-pixels W5, W6, W7, W8 are transferred to the shared FD region FD4. Further, the exposure control lines TG5, TG5, TG7, and TG8 simultaneously input low voltage levels, and the transfer transistors corresponding to the sub-pixels R5, R6, R7, R8, W5, W6, W7, and W8 are disconnected. The charges, which are generated by the four sub-pixels R5, R6, R7, and R8 and are accumulated in the FD region FD2, are added together to form a third charge. The third charge is converted, after passing through the amplification transistor SF3, to an analogue signal. Further, by controlling the switch S6 to be closed and controlling the switch S5 to be disconnected, the analogue signal is output to the analogue-to-digital converter ADC1-2 via the column control line COL2. The charges, which are generated by the four sub-pixels W5, W6, W7, and W8 and are accumulated in the FD region FD4, are added together to form a fourth charge. The fourth charge is converted, after passing through the amplification transistor SF4, to an analogue signal. Further, by controlling the switch S8 to be closed and controlling the switch S7 to be disconnected, the analogue signal is output to the analogue-to-digital converter ADC1-4 via the column control line COL4. In the above process, the switches S17 and S18 in the first conversion circuit 141 and the switches S19 and S20 of the third switching unit 143 are disconnected.

For the combination mode in the primary merging output mode, the exposure control lines TG1 and TG3 simultaneously input high voltage levels, the transfer transistors corresponding to the sub-pixels W1, W3, R1, are R3 are turned on. The charges of the two sub-pixels W1 and W3 are transferred into the shared FD region FD1, and the charges of the two sub-pixels R1 and R3 are transferred into the shared FD region FD2. Further, the exposure control lines TG1, TG3, TG5, and TG7 simultaneously input low voltage levels, the transfer transistors corresponding to the sub-pixels W1, W3, R1, and R3 are disconnected. The charges, which are generated by the two sub-pixels W1 and W3 and are accumulated in the FD region FD1, are added together to form a first charge. The first charge is converted, after passing through the amplification transistor SF1, to an analogue signal. Further, by controlling the switch S1 to be closed and controlling the switch S2 to be disconnected, the analogue signal is output to the analogue-to-digital converter ADC1-1 via the column control line COL1. Correspondingly, the charges, which are generated by the two sub-pixels R1 and R3 and are accumulated in the FD region FD2, are added together to form a second charge. The second charge is converted, after passing through the amplification transistor SF2, to an analogue signal. Further, by controlling the switch S3 to be closed and controlling the switch S4 to be disconnected, the analogue signal is output to the analogue-to-digital converter ADC1-3 via the column control line COL3.

The reset control line RST inputs a high voltage level to reset the reset transistor, and the charges accumulated in the FD regions FD1 and FD2 are cleared. Further, the exposure control lines TG2 and TG4 firstly input high voltage levels, and subsequently, input low voltage levels, to enable the charges, which are generated by the two sub-pixels W2 and W4 and are accumulated in the FD region FD1, to be added together to form a third charge and to enable the charges, which are generated by the two sub-pixels R2 and R4 and are accumulated in the FD region FD1, to be added together to form a fourth charge. By controlling the switch S2 to be closed and the switch S1 to be disconnected, the third charge is output to the analogue-to-digital converter ADC1-2 via the column control line COL2, and the fourth charge is output to the analogue-to-digital converter ADC1-4 via the column control line COL2. At the same time, by controlling the switch S17 in the first conversion circuit 141 to be closed, an averaging operation may be performed on the digital signal of the first charge read out from the analogue-to-digital converter ADC1-1 and the digital signal of the third charge read out from the analogue-to-digital converter ADC1-2. By controlling the switch S18 in the first conversion circuit 141 to be closed, an averaging operation may be performed on the digital signal of the second charge read out from the analogue-to-digital converter ADC1-3 and the digital signal of the fourth charge read out from the analogue-to-digital converter ADC1-4. In the above process, the switches S19 and S20 of the third switching unit 143 are disconnected.

Figure 15:
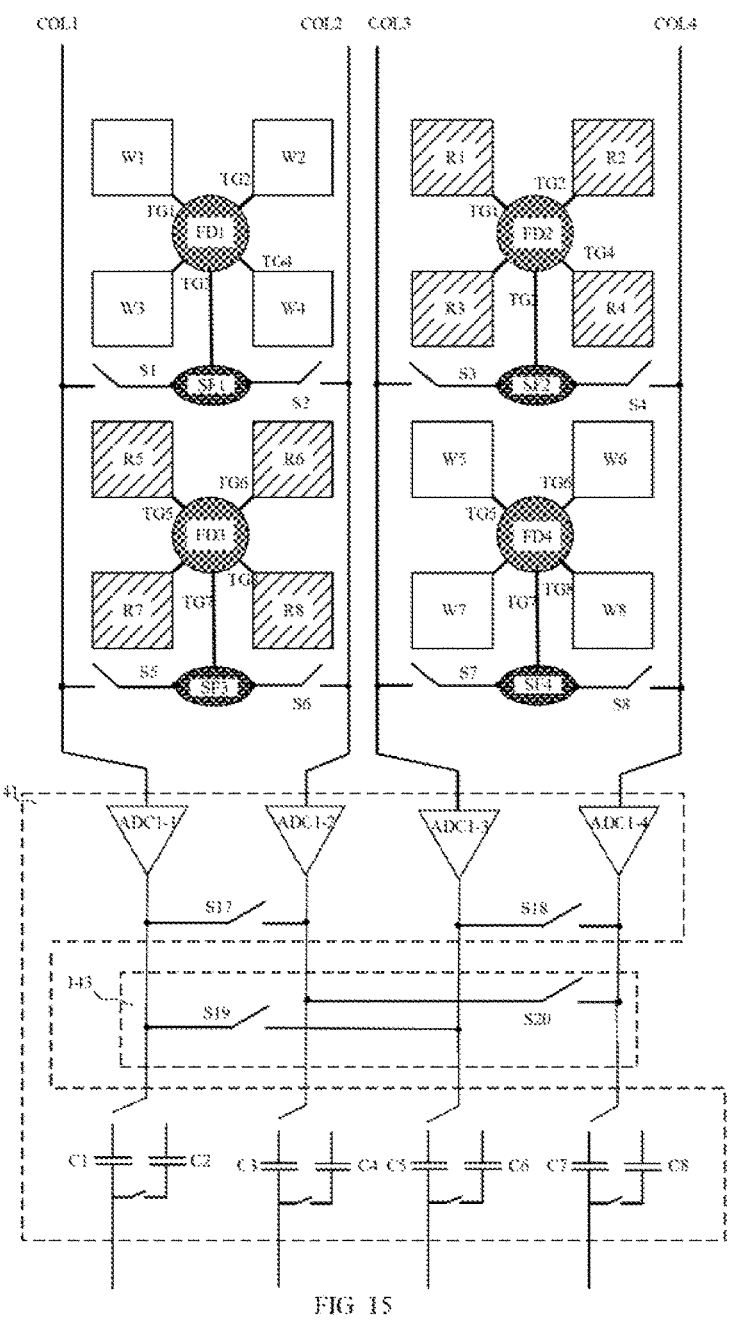

As shown in FIG. 15, the reading out process of the digital averaging mode in the primary merging output mode may be referred to the reading out process of the digital averaging mode in the primary merging output mode in the above embodiment, which will not be repeated herein.

For the secondary merging output mode, as shown in FIG. 13 and FIG. 14, in an example, eight sub-pixels W1-W4 and W5-W8 are arranged. For example, an output result of the primary merging output mode (the additive mode or the combination mode) performed on the four sub-pixels W1-W4 may be read out by the analogue-to-digital converter ADC1-1. An output result of the primary merging output mode (the additive mode or the combination mode) performed on the four sub-pixels W5-W8 may be read out by the analogue-to-digital converter ADC1-3. Further, the switch S19 is closed and the switch S17 is disconnected, such that the analogue-to-digital converters ADC1-1 and ADC1-3 are short circuited, enabling the first digital signal read out by the analogue-to-digital converter ADC1-1 and the second digital signal read out by the analogue-to-digital converter ADC1-3 to be averaged, and therefore, charge data taking all pixels 110 of the first diagonal direction as a unit may be read out. To be noted that all pixels in the pixel array have a same primary merging output mode. The secondary merging output mode also includes the additive mode, the combination mode, the digital averaging mode, and the analogue averaging mode. The primary merging output mode is the same as the secondary merging output mode.

Figure 16:
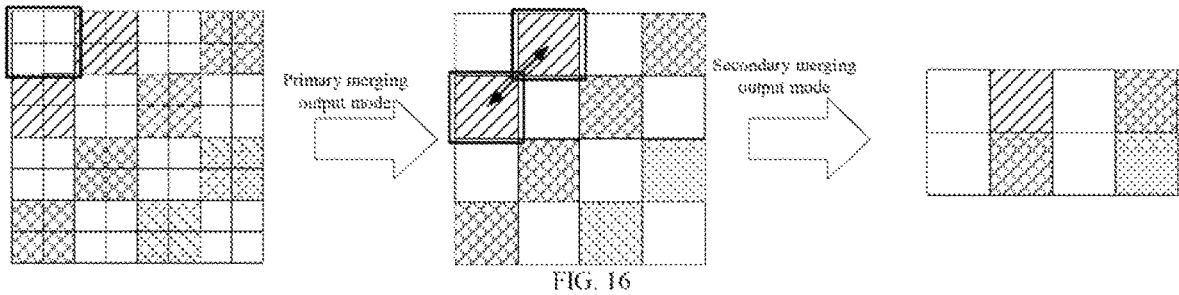
FIG. 16 is a schematic view of a primary merging output mode being switched to be a secondary merging output mode according to an embodiment of the present disclosure.

As shown in FIG. 16, for the image sensor in the present embodiment, on the basis of the output results of the primary merging output mode, the secondary merging output mode may be performed to merge the charge data of all pixels in the pixel array 11, and a merged charge data is output. Therefore, the image sensor in the embodiments of the present disclosure supports the charge data of all sub-pixels in all pixel units to be read out in the full-resolution output mode, in the primary merging output mode, and in the secondary merging output. Output modes of the image sensor may be applied more flexibly, and therefore, the image sensor may be applicable to more scenarios.

In an embodiment, for illustrative purposes, Table 1 is a comparative table of advantages of the full-resolution output mode, the primary merging output mode, and the secondary merging output mode.

Table 1 is a comparative table of advantages of the full-resolution output mode, the primary merging output mode, and the secondary merging output mode.

| mode | full-resolution output mode | primary merging output mode | | | secondary merging output mode | | |
|---|---|---|---|---|---|---|---|
| | | Additive mode | Combination mode | Averaging mode | Additive mode | Combination mode | Averaging mode |
| resolution | 1x | 0.25x | 0.25x | 0.25x | 0.0625x | 0.0625x | 0.0625x |
| S/N ratio | 0 | 6 dB | 4.5 dB | 3 dB | 12 dB | 9 dB | 6 dB |
| Frame rate | 1x | 4x | 2x | 1x | 16x | 4x | 1x |
| Power consumption | 1x | 0.25x | 0.5x | 1x | 0.0625x | 0.25x | 1x |
| properties | High resolution, Low S/N ratio; Low frame rate; High power consumption; Medium dynamic range | Medium resolution, Medium S/N ratio; Medium-high frame rate; Low power consumption; Low dynamic range | Medium resolution, Medium-low S/N ratio; Medium frame rate; Medium power consumption; Medium dynamic range | Medium resolution, Medium S/N ratio; low frame rate; High power consumption; High dynamic range | Medium resolution, Medium S/N ratio; low frame rate; High power consumption; Low dynamic range | Low resolution, Medium-high S/N ratio; Medium-high frame rate; Low power consumption; Medium dynamic range | Low resolution; Medium S/N ratio; low frame rate; High power consumption; High dynamic range |

Based on the advantages of each output mode as shown in Table 1, it can be seen that different output modes can be applied in different scenarios.

Exemplarily, in a scenario of capturing an image, when an image having a high definition is to be captured (such as a scene having more textures, such as a grass land and so on) a high-brightness scene is to be captured (such as a sunny day outdoor), the image sensor may be controlled to read out the data of the pixel array in the full-resolution mode to perform full-size image capturing. When a low-brightness scene is to be captured (such as an indoor scene or a cloudy outdoor day), the image sensor may be controlled to read out the data of the pixel array based on a medium-resolution output mode (such as the primary merging output mode) to capture the image. When a dark scene is to be captured (such as a night scene), the image sensor may be controlled to read out the data of the pixel array based on an output mode having a large amount of incident light and a high signal-to-noise ratio (such as the secondary merging output mode) to capture the image.

Exemplarily, for a scenario of video shooting, when a 4K2K video needs to be shot, the primary merging output mode may be applied to read out the data of the pixel array. When a 1080P video needs to be shot, the secondary merging output mode may be applied to read out the data of the pixel array. For a general preview mode, the secondary merging output mode may be applied to read out the data of the pixel array.

Further, in the primary merging output mode and the secondary merging output mode, following principles may be applied to determine which one of the additive mode, the combination mode, and the averaging mode is to be performed.

When the high signal-to-noise ratio is required, such as capturing images for a dark scene or a night scene; or when low power consumption is required, such as capturing a long-time preview image or shooting a video; or when the high frame rate is required, such as a HDR video is to be shot or a HDR preview is to be captured or a slow-motion video is to be shot, the additive mode may be applied to read out the data of the pixel array.

When both the resolution and the signal-to-noise ratio need to be considered, such as an indoor scene (shopping malls), cloudy days, and most other scenes, the combination mode may be applied to read out the data of the pixel array.

When the high dynamic range is required, such as outdoor scene on a sunny day, the digital averaging mode or the analogue averaging mode may be applied to read out the data of the pixel array.

Figure 17:
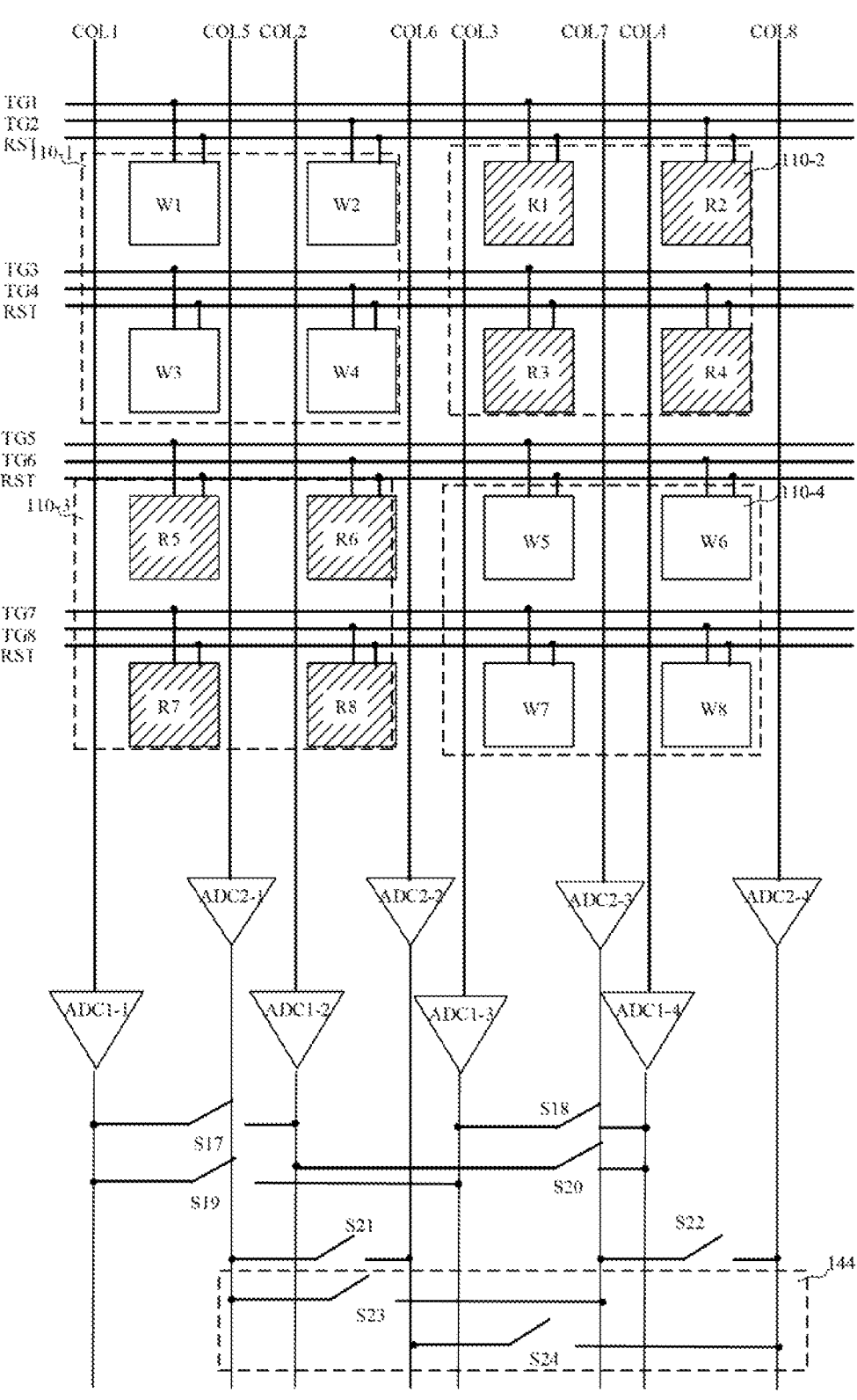
FIG. 17 is a schematic view of a circuit of the pixel unit according to another embodiment of the present disclosure.
Figure 18:
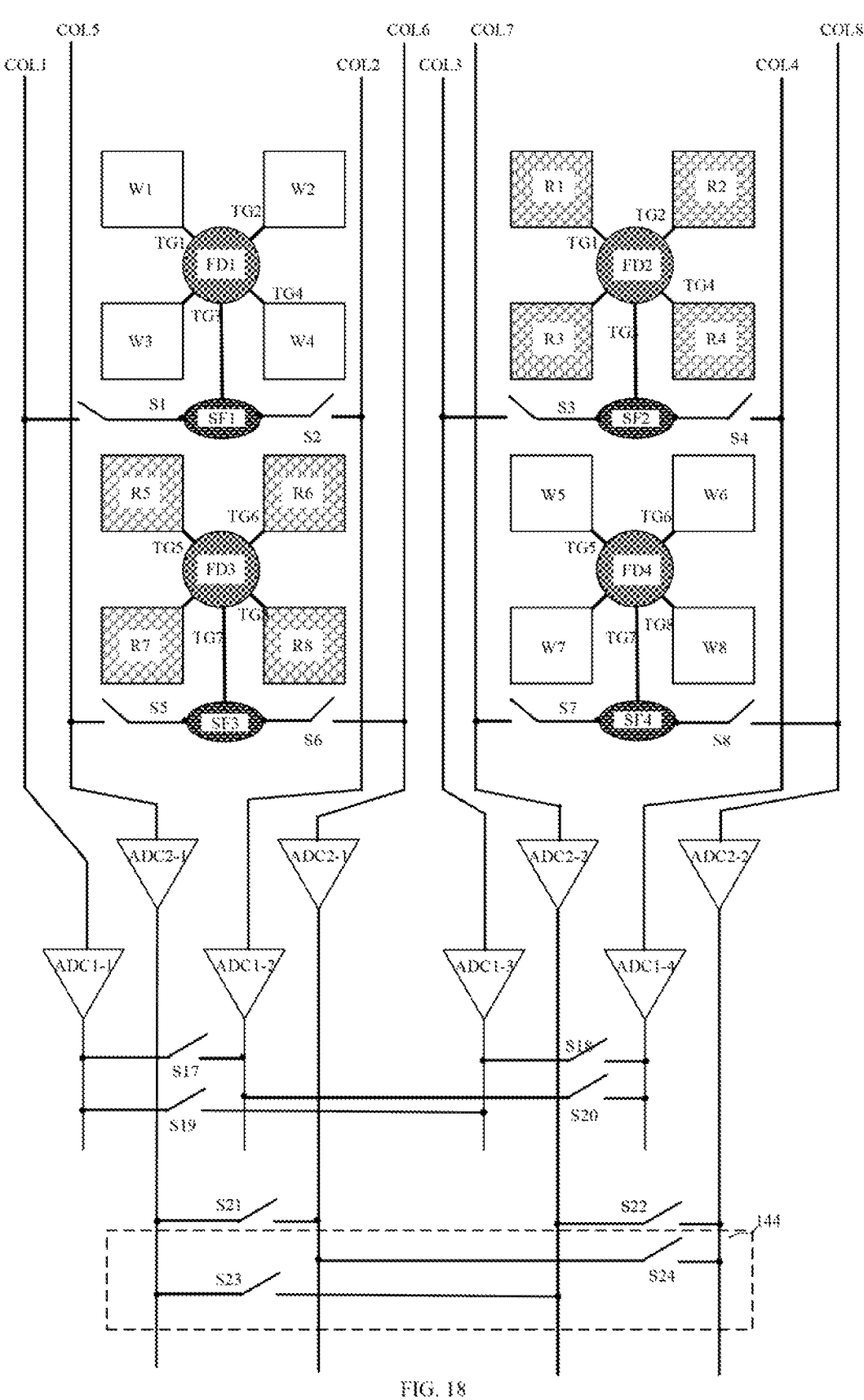
FIG. 18 is a schematic view showing operation principles of the pixel unit operating based on the first conversion circuit according to an embodiment of the present disclosure.

As shown in FIG. 17 and FIG. 18, in an embodiment, in one pixel unit, first conversion circuits of two pixels located in one row are connected to each other, and first conversion circuits of two pixels located in one column are independent of each other, and the two pixels located in one column do not share one first conversion circuit. Specifically, each pixel unit is arranged with eight column control lines COL1-COL8. Four first conversion circuits 141 of one pixel unit include: eight analogue-to-digital converters ADC1-1, ADC1-2, ADC1-3, ADC 1-4, ADC2-1, ADC2-2, ADC2-3, and ADC2-4; the switch S17, the switch S18, a switch S21, and a switch S22. The pixel unit further includes a fourth switching unit 144 configured to connect two first conversion circuits 141 disposed in one row. The third switching unit 143 includes a switch S23 and a switch S24.

Each column control line is correspondingly connected to one analogue-to-digital converter. That is, output ends of all pixels 110 in one row may be correspondingly connected to the analogue-to-digital converters disposed in the same row. The analogue-to-digital converters ADC1-1, ADC1-2, ADC1-3, and ADC1-4 are located in one row, and the analogue-to-digital converters ADC2-1, ADC2-2, ADC2-3, and ADC2-4 are located in one row. Specifically, the analogue signal output from the first pixel 110-1 may be transmitted to the analogue-to-digital converter ADC1-1 via the column control line COL1 and transmitted to the analogue-to-digital converter ADC1-2 via the control line COL2. The analogue signals output from the second pixel 110-2 may be transmitted to the analogue-to-digital converter ADC1-3 via the column control line COL3 and transmitted to the analogue-to-digital converter ADC1-4 via the control line COL4. The analogue signals output from the third pixel 110-3 may be transmitted to the analogue-to-digital converter ADC2-1 via the column control line COL5 and transmitted to the analogue-to-digital converter ADC2-2 via the control line COL6. The analogue signals output from the fourth pixel 110-4 may be transmitted to the analogue-to-digital converter ADC2-3 via the column control line COL7 and transmitted to the analogue-to-digital converter ADC2-4 via the control line COL8.

The image sensor as shown in FIGS. 17 and 18 in the present disclosure may also perform the full-resolution output mode and the primary merging output mode to correspondingly read out the analogue signal corresponding to the charges of each pixel in the pixel array. Specific processes of each output mode may be referred to the above embodiment, and will not be repeated. In the present embodiment, for each pixel unit, by increasing the number of column control lines and the number of analogue-to-digital converters, a readout speed of each pixel in the pixel unit may be correspondingly increased, and a readout efficiency of the pixel array is improved.

Figure 19:
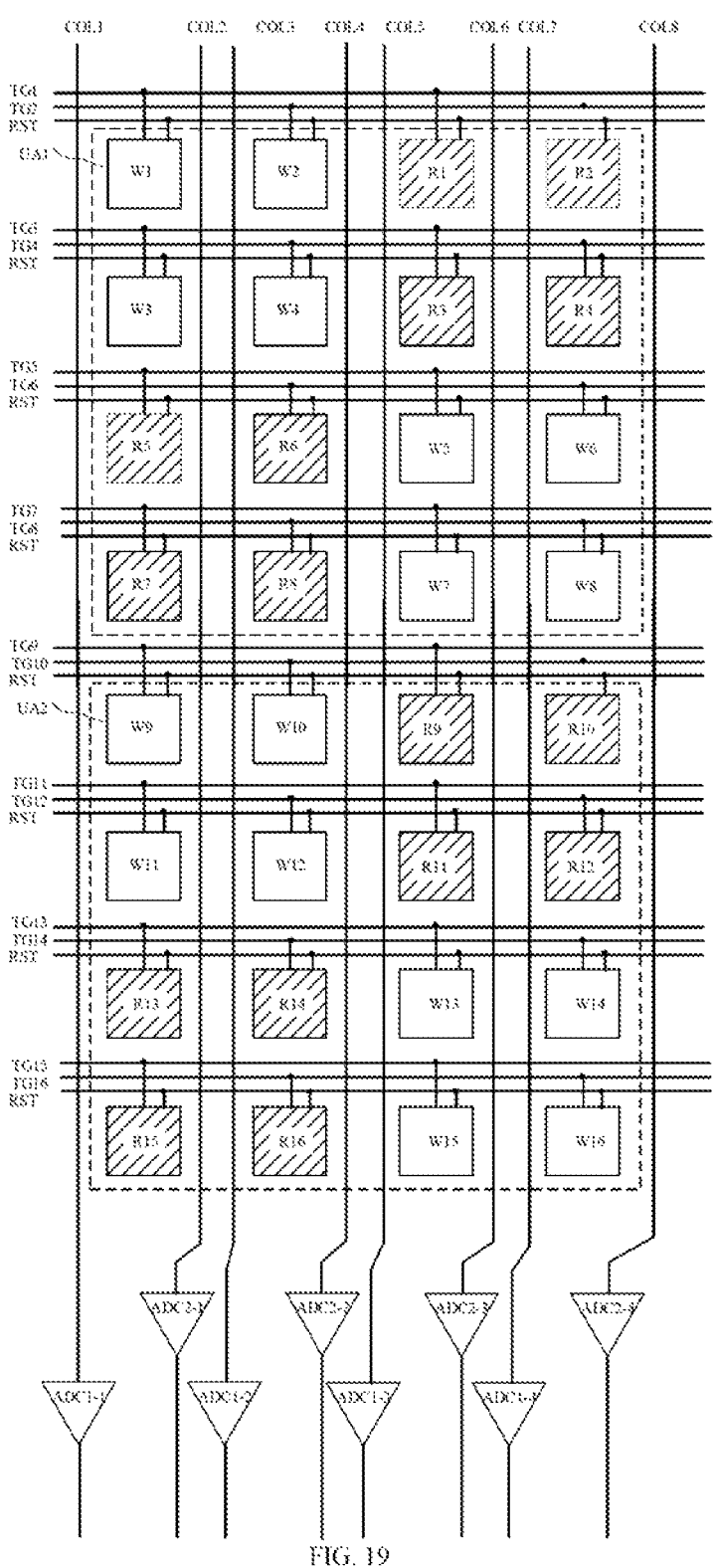
FIG. 19 is a schematic view of a circuit of a pixel set according to an embodiment of the present disclosure.
Figure 20:
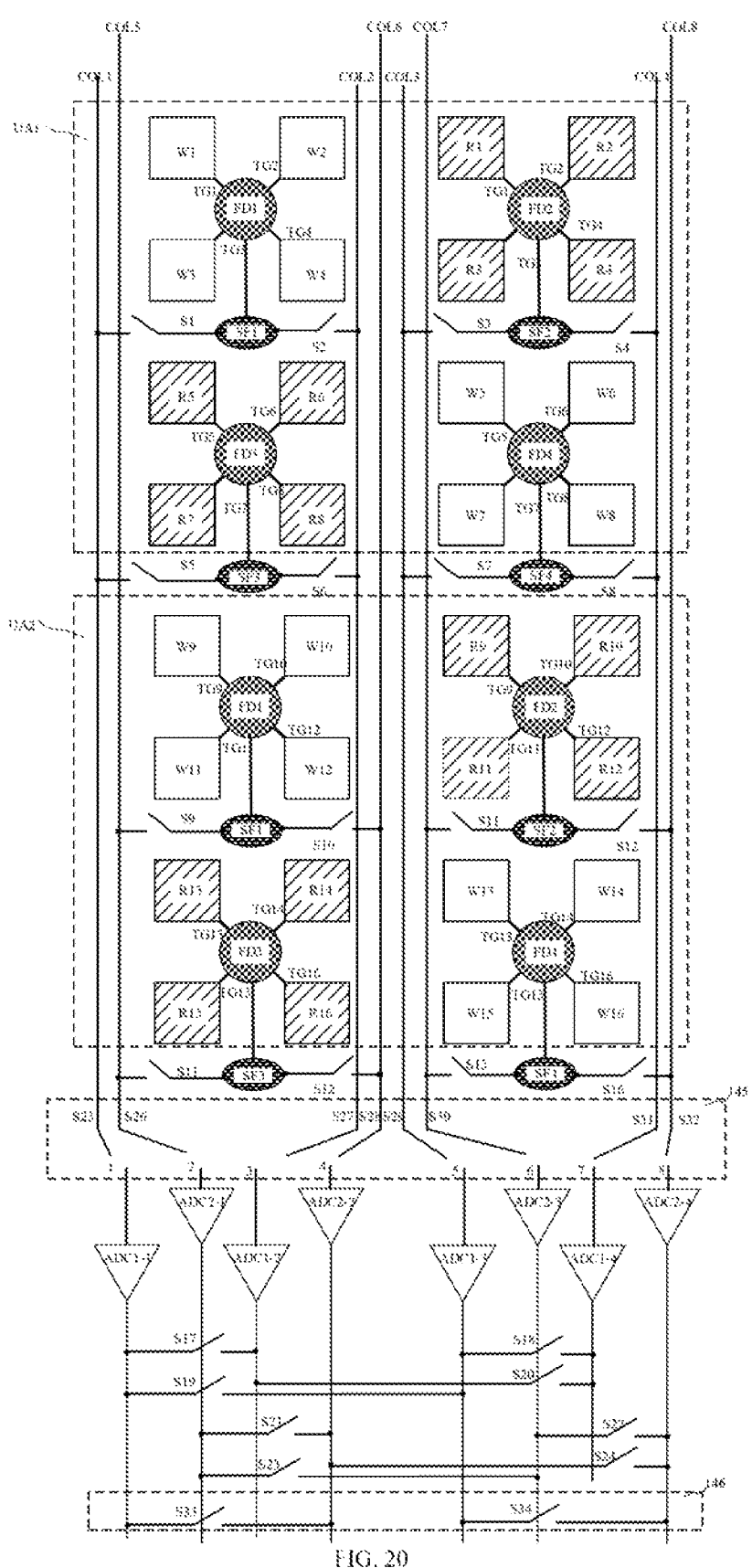
FIG. 20 is a schematic view showing operation principles of the pixel unit operating based on the first conversion circuit according to another embodiment of the present disclosure.

In an embodiment, the pixel array includes a plurality of pixel sets disposed in an array. Each pixel set includes a first pixel unit UA1 and a second pixel unit UA2 arranged in a 2*1 array, as shown in FIG. 19 and FIG. 20. The first conversion circuit 141 corresponding to the first pixel unit UA1 is electrically connected to the first conversion circuit corresponding to the second pixel unit UA2. The pixel set further includes a switch array 145. The switch array 145 is connected to each column control line and each first conversion circuit 141 and is configured to selectively conduct a path between a target analogue-to-digital converter set and any output end of each pixel circuit of the first pixel unit UA1 and the second pixel unit UA2. The target analogue-to-digital converter set includes one analogue-to-digital converter corresponding to the first pixel unit UA1 and one analogue-to-digital converter corresponding to the second pixel unit UA2.

In the following embodiments, each of the first pixel unit UA1 and the second pixel unit UA2 is the first class of pixel units U.

In an embodiment, one pixel set is arranged with a first column control line set and a second column control line set. Each of the first column control line set and the second column control line set includes four column control lines. The first column control line set includes column control lines COL1, COL2, COL3, and COL4. The column control lines in the first column control line set are configured to transfer analogue signals output from all pixels in the first pixel unit UA1. The second column control line set includes column control lines COL5, COL6, COL7, and COL8. The column control lines in the second column control line set are configured to transfer the analogue signals output from all pixels in the second pixel unit UA2.

One pixel set may include four first conversion circuits. The four first conversion circuits may include a first analogue-to-digital converter set, a second analogue-to-digital converter set, a switch S17, a switch S18, a switch S21, a switch S22. Each of the first analogue-to-digital converter set and the second analogue-to-digital converter set includes four analogue-to-digital converters. Specifically, the first analogue-to-digital converter set may include analogue-to-digital converters ADC1-1, ADC1-2, ADC1-3, and ADC1-4 located in one row. The second analogue-to-digital converter set may include analogue-to-digital converters ADC2-1, ADC2-2, ADC2-3, and ADC2-4 located in one row.

A first side of the switch array 145 may be connected to the eight column control lines COL1-COL8, and a second side of the switch array 145 may be connected to the eight analogue-to-digital converters ADC1-1 to ADC2-4. The switch array 145 is configured to selectively conduct a pathway between any column control line of the first column control line set and one analogue-to-digital converter of the first analogue-to-digital converter set or one analogue-to-digital converter of the second analogue-to-digital converter set. The switch array 145 is further configured to selectively conduct a pathway between any column control line of the second column control line set and one analogue-to-digital converter of the first analogue-to-digital converter set or one analogue-to-digital converter of the second analogue-to-digital converter set.

In an embodiment, the switch array 145 may include eight switches, such as a switch S25, a switch S26, a switch S27, a switch S28, a switch S29, a switch S30, a switch S31, and a switch S32. Specifically, each of the eight switches may be a single-pole and double-throw switch. For example, a single terminal of each single-pole and double-throw switch is correspondingly connected to one column control line. One of two selection terminals of each single-pole and double-throw switch may be connected to one analogue-to-digital converter in the first analogue-to-digital converter set; and the other one of two selection terminals of each single-pole and double-throw switch may be connected to one analogue-to-digital converter in the second analogue-to-digital converter set. Exemplarily, the single terminals of the eight switches S25-S32 are in one-to-one connection with the eight column control lines COL1-COL8. The selection terminal of the switch S25 is connected to the analogue-to-digital converter ADC1-1, and the selection terminal of the switch S26 is connected to the analogue-to-digital converter ADC2-1. The selection terminal of the switch S27 is connected to the analogue-to-digital converter ADC1-2, and the selection terminal of the switch S28 is connected to the analogue-to-digital converter ADC2-2. The selection terminal of the switch S29 is connected to the analogue-to-digital converter ADC1-3, and the selection terminal of the switch S30 is connected to the analogue-to-digital converter ADC2-3. The selection terminal of the switch S31 is connected to the analogue-to-digital converter ADC1-4, and the selection terminal of the switch S32 is connected to the analogue-to-digital converter ADC2-5.

The pixel set further includes a fifth switching unit 146 arranged at the output end of the first conversion circuit 141. The fifth switching unit 146 is connected between one digital-to-analogue converter of the first analogue-to-digital converter set and one analogue-to-digital converter of the second analogue-to-digital converter set. Specifically, the fifth switching unit 146 may include a switch S33 and a switch S34. When the fifth switching unit 146 is turned on, the fifth switching unit 146 is configured to perform the averaging operation on digital signals output from two analogue-to-digital converters that are connected to each other. Specifically, when the switch S33 is turned on, the switch S33 performs the averaging operation on two digital signals that are read out from the analogue-to-digital converters ADC1-1 and ADC2-3. When the switch S34 is turned on, the switch S34 performs the averaging operation on two digital signals that are read out from the analogue-to-digital converters ADC1-3 and ADC2-4.

For the ease of illustration, the operation principles of the full-resolution output mode and the digital averaging mode in the primary merging output mode will be explained by taking the image sensor shown in FIG. 19 and FIG. 20 as an example.

For the full-resolution output mode, the exposure control lines TG1, TG5, TG9, and TG13 input high voltage levels, the transfer transistors of the sub-pixels W1, R1, R5, W5, W9, R9, R13, and W13 corresponding to the exposure control lines TG1, TG5, TG9, and TG13 are turned on. Charges generated by the corresponding sub-pixel W1 are transferred to the corresponding FD region FD1; charges generated by the corresponding sub-pixel R1 are transferred to the corresponding FD region FD2; charges generated by the corresponding sub-pixel R5 are transferred to the corresponding FD region FD3; charges generated by the corresponding sub-pixel W5 are transferred to the corresponding FD region FD4; charges generated by the corresponding sub-pixel W9 are transferred to the corresponding FD region FD5; charges generated by the corresponding sub-pixel R9 are transferred to the corresponding FD region FD6; charges generated by the corresponding sub-pixel R13 are transferred to the corresponding FD region FD7; and charges generated by the corresponding sub-pixel W13 are transferred to the corresponding FD region FD8. Further, the exposure control lines TG1, TG5, TG9, and TG13 input low voltage levels, and the transfer transistors of the corresponding sub-pixels W1, R1, R5, W5, W9, R9, R13, and W13 are disconnected. The switches S1, S3, S6, S8, S17, S19, S22, and S24 are closed, and the switches S2, S4, S5, S7, S18, S20, S21, S23, and S17-S24 are disconnected. The switches S25-S32 are connected to contacts 1-8 in sequence, i.e., connected to the eight analogue-to-digital converters ADC1-1-ADC2-4 in sequence. Specifically, the charges, which are transferred from the sub-pixel W1 to the FD region FD1, are converted into the analogue signal by the amplification transistor SF1, the analogue signal is input into the analogue-to-digital converter ADC1-1 via the column control line COL1. The charges, which are transferred from the sub-pixel R1 to the FD region FD2, are converted into the analogue signal by the amplification transistor SF2, the analogue signal is input into the analogue-to-digital converter ADC1-3 via the column control line COL3. The charges, which are transferred from the sub-pixel R5 to the FD region FD3, are converted into the analogue signal by the amplification transistor SF3, the analogue signal is input into the analogue-to-digital converter ADC1-2 via the column control line COL2. The charges, which are transferred from the sub-pixel W5 to the FD region FD4, are converted into the analogue signal by the amplification transistor SF4, the analogue signal is input into the analogue-to-digital converter ADC1-4 via the column control line COL4. The charges, which are transferred from the sub-pixel W9 to the FD region FD5, are converted into the analogue signal by the amplification transistor SF5, the analogue signal is input into the analogue-to-digital converter ADC2-1 via the column control line COL5. The charges, which are transferred from the sub-pixel R9 to the FD region FD6, are converted into the analogue signal by the amplification transistor SF6, the analogue signal is input into the analogue-to-digital converter ADC2-3 via the column control line COLT. The charges, which are transferred from the sub-pixel R13 pixel 110 to the FD region FD7, are converted into the analogue signal by the amplification transistor SF7, the analogue signal is input into the analogue-to-digital converter ADC2-2 via the column control line COL6. The charges, which are transferred from the sub-pixel W13 pixel 110 to the FD region FD8, are converted into the analogue signal by the amplification transistor SF8, the analogue signal is input into the analogue-to-digital converter ADC2-4 via the column control line COL8. Therefore, data of the sub-pixels W1, R1, R5, W5, W9, R9, R13, and W13 may be read out at the same time, and that is, charge data of some sub-pixels in two rows of pixel units U may be read out at the same time.

In the above process, each switch at each output end of the analogue-to-digital converter may be disconnected. Similarly, based on the voltage levels output to each exposure control line and each reset control line, the on-off state of each of the switches S1-S24, and the on/off state of each switch in the switch array 145, the charge data of each sub-pixel of each pixel in the pixel set may be read out taking the sub-pixel as a unit.

The digital averaging mode in the primary merging output mode will be illustrated by taking the sub-pixels W1, W2, W3 and W4 as an example. The exposure control line TG1 inputs a high voltage level to turn on the transfer transistor. At the same time, the switch S1 is turned on and the switch S25 is connected to the contact 1, the charges, which are transferred from the sub-pixel W1 to the FD region FD1, are converted into the analogue signal by the amplification transistor SF1, and the analogue signal is transferred to the analogue-to-digital converter ADC1-1 through the column control line COL1. Subsequently, the reset transistor is reset to clear the charges in the FD region FD1, and the transfer transistor 2 of the sub-pixel W2 is controlled to be turned on, the switch S1 is turned on, and the switch S25 is connected to the contact 2. The charges, which are transferred from the sub-pixel W2 to the FD region FD1, are converted into the analogue signal by the amplification transistor SF1, and the analogue signal is transferred to the analogue-to-digital converter ADC2-1 through the column control line COL1. Subsequently, the reset transistor is reset to clear the charges in the FD region FD1, and the transfer transistor 3 of the sub-pixel W3 is controlled to be turned on, the switch S2 is turned on, and the switch S27 is connected to the contact 3. The charges, which are transferred from the sub-pixel W3 to the FD region FD1, are converted into the analogue signal by the amplification transistor SF1, and the analogue signal is transferred to the analogue-to-digital converter ADC1-2 through the column control line COL2. Subsequently, the reset transistor is reset to clear the charges in the FD region FD1, and the transfer transistor 4 of the sub-pixel W4 is controlled to be turned on, the switch S2 is turned on, and the switch S27 is connected to the contact 4. The charges, which are transferred from the sub-pixel W4 to the FD region FD1, are converted into the analogue signal by the amplification transistor SF1, and the analogue signal is transferred to the analogue-to-digital converter ADC2-2 through the column control line COL2. Finally, the switches S17, S21, and S33 are controlled to be closed at the same time, such that digital signals read out from the analogue-to-digital converters ADC1-1, ADC1-2, ADC2-1, and ADC2-2 may be averaged to output an average digital voltage signal of the four sub-pixels W1, W2, W3, and W4.

For the image sensor in the present embodiment, the switch array 145 is arranged, and the analogue-to-digital converter set is correspondingly arranged for each row of pixel units U. In this way, the charge data of the two rows of pixel units U may be read out at the same time, such that an efficiency of reading out the data of each pixel 110 in the pixel array may be improved.

In an embodiment, when the plurality of pixel sets are arranged in a one-dimensional array along a column direction of the pixel array, the charge data of all pixel sets in one row are read out in parallel with the charge data of another row of pixel sets. Exemplarily, when the number of pixel sets is two. The two pixel sets may be denoted as a first pixel set and a second pixel set. The first pixel set is located in one row, and the second pixel set is located in another row. The first pixel set located in a first pixel set row and the second pixel set located in a second pixel set row may be read out in parallel to each other, the charge data of the first pixel set and the charge data of the second pixel set are read out simultaneously. The in-parallel reading-out process may be interpreted as the pixel sets in one row being independent from the pixel sets in another row and the digital signal of the pixel sets in one row being read out independently from the digital signal of the pixel sets in another row. Exemplarily, the first pixel set and the second pixel set are independent of each other. For example, first conversion circuits, switches, column control lines, and so on included in one pixel set are independent from first conversion circuits, switches, column control lines, and so on included in another pixel set. That is, the second pixel set may be obtained by copying the first pixel set.

To be noted that in the embodiments of the present disclosure, the plurality of pixel sets may be arranged in the row direction, and all sub-pixels located in one row may be connected to one exposure control line and one reset control line.

Figures 21, 22:
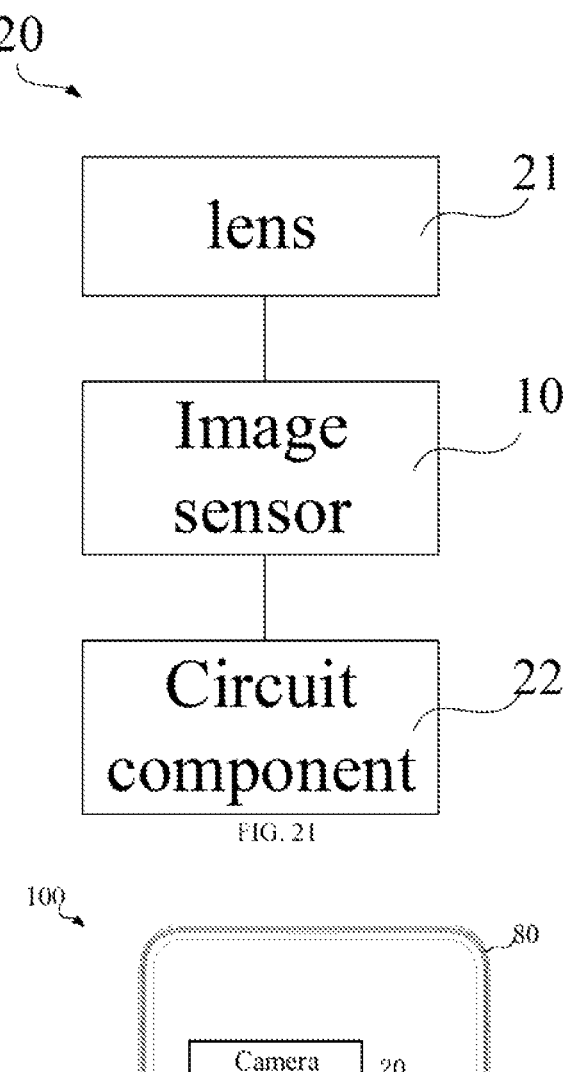
FIG. 21 is a schematic view of a camera assembly according to an embodiment of the present disclosure.
FIG. 22 is a schematic view of a mobile terminal according to an embodiment of the present disclosure.

As shown in FIG. 21, the present disclosure further provides a camera assembly. The camera assembly 20 includes the image sensor 10 of any embodiment of the present disclosure and a lens 21. The lens 21 is configured to form an image onto the image sensor 10. For example, light from a captured target is imaged onto the image sensor 10 through the lens 21. The image sensor 10 is disposed on a focal plane of the lens 21. The camera assembly 20 may further include a circuit component 22. The circuit component 22 is configured to obtain electrical energy and to transmit data with an external source. For example, the circuit component may be connected to a local power source to obtain the electrical energy or may be connected to a memory and a processor to transmit image data or control data.

The camera assembly 20 may be arranged at a rear of the mobile phone to serve as a rear camera. Understandably, the camera assembly 20 may alternatively be arranged at a front of the mobile phone to serve as a front camera.

As shown in FIG. 22, the present disclosure also provides a mobile terminal. The mobile terminal 100 includes the camera assembly 20 of any embodiment of the present disclosure and a housing 80. The camera assembly 20 is coupled with the housing 80. Specifically, the camera assembly 20 is arranged on the housing 80. The housing 80 includes a middle frame and a rear plate. The camera assembly 20 is fixedly arranged on the middle frame or the rear plate.

The mobile terminal 100 further includes a processor and a memory that are connected to each other via a system bus. The processor is configured to provide computing and control capabilities to support the entire electronic device to operate. The memory may include a non-volatile storage medium and an internal memory. The non-volatile storage medium stores an operating system and computer programs. The internal memory provides a cached operating environment for the operating system and computer programs in the non-volatile storage medium. The electronic device may be any terminal device such as a mobile phone, a tablet computer, a personal digital assistant (PDA), a point of sales (POS), a vehicle-mounted computer, a wearable device, and so on.

The above-described embodiments show only various embodiments of the present disclosure, which are described more specifically and in more details, but the description shall not be interpreted as limiting the scope of the present disclosure. Any ordinary skilled person in the art may perform deformations and improvements without departing from the concept of the present disclosure, and the deformations and improvements shall fall within the scope of the present disclosure. Therefore, the scope of the present disclosure shall be subject to the attached claims.

What is claimed is:

1. An image sensor, comprising:
a pixel array, comprising a plurality of pixels, each of the plurality of pixels comprising a plurality of sub-pixels, wherein the plurality of sub-pixels in one of the plurality of pixels share one floating diffusion region; each of the plurality of pixels comprises a pixel circuit arranged with a plurality of output ends, the pixel circuit comprises a plurality of photoelectric conversion elements in one-to-one correspondence with the plurality of sub-pixels; the pixel circuit is configured to transfer charges, which are generated by at least one of the plurality of photoelectric conversion elements in the one of the plurality of pixels, to the floating diffusion region, the transferred charges are accumulated in the floating diffusion region; the pixel circuit is configured to select, based on the accumulated charges, at least one of the plurality of output ends of the pixel circuit to output an analogue signal corresponding to the charges in the floating diffusion region;
a plurality of first conversion circuits, corresponding to a plurality pixel circuits of the plurality of pixels, wherein each of the plurality of first conversion circuits is connected to the plurality of output ends of one of the plurality of pixel circuits; for each of the plurality of first conversion circuits and a corresponding one of the plurality pixel circuits corresponding to one of the plurality of pixels, the first conversion circuit is configured to perform analogue-to-digital conversion on the analogue signal output from the pixel circuit and to read out, cooperatively with the pixel circuit, a digital signal after the conversion based on either a full-resolution output mode or a primary merging output mode; wherein the full-resolution mode means that the digital signal is read out taking one sub-pixel as a unit, and the primary merging output mode means that the digital signal is read out taking one pixel as a unit.

2. The image sensor according to claim 1, wherein each pixel comprises n*m sub-pixels arranged in a matrix; each pixel is arranged with m column control lines, each pixel circuit comprises m output ends; the m output ends are in one-to-one connection with the m column control lines, the m column control lines are connected to the corresponding one of the plurality of first conversion circuits to form m output paths; the pixel circuit is further configured to select, based on the accumulated charges, to conduct at least one of the m output paths to output the analogue signal corresponding to the charges in the floating diffusion region; one of the n and the m is a positive integer greater than 1, and the other one of the n and the m is a positive integer greater than or equal to 1.

3. The image sensor according to claim 2, wherein m=n=2, each pixel comprises 2*2 sub-pixels; each pixel circuit comprises a first output end and a second output end; each pixel is arranged with a first column control line and a second column control line; the first output end is connected to the first column control line via a first switch to form a first output path, the second output is connected to the second column control line via a second switch to form a second output path.

4. The image sensor according to claim 2, wherein each first conversion circuit comprises:
m first conversion units, in one-to-one connection with the m column control lines, wherein each of the m first conversion units comprises an analogue-to-digital converter connected to one of the m column control lines to perform analogue-to-digital conversion on the received analogue signal to output the digital signal; and a first switching unit, connected to the m first conversion units, wherein when the first switching unit is turned on, the first conversion circuit performs an averaging operation on m digital signals.

5. The image sensor according to claim 4, wherein each first conversion circuit comprises:

a storage unit, connected to the first switching unit and configured to store digital signals corresponding to pixels located in one column of the pixel array into different sections;

a second switching unit, connected to the storage unit and configured to perform the averaging operation on the digital signals stored in the different sections.

6. The image sensor according to claim 5, wherein m=n=2; the storage unit comprises a first capacitor and a second capacitor, the second switching unit comprises a first switch and a second switch; a first end of the first switch is connected to an output end of the analogue-to-digital converter, one of two second ends of the first switch is connected to a first end of the first capacitor, and the other one of the two second ends of the first switch is connected to a first end of the second capacitor; the second switch is connected between a second end of the first capacitor and a second end of the second capacitor.

7. The image sensor according to claim 2, wherein each first conversion circuit comprises a second conversion unit, a first sub-switch, a second sub-switch, a third sub-switch, a fourth sub-switch and a fifth sub-switch; when n=m=2, the second conversion unit comprises four analogue-to-digital converters ADC1-1, ADC1-2, ADC2-1, and ADC2-2, a first column control line is connected to the analogue-to-digital converters ADC1-1 and ADC2-1 via the third sub-switch, a second column control line COL2 is connected to the analogue-to-digital converters ADC1-2 and ADC2-2 via the fourth sub-switch; the first sub-switch is connected between the analogue-to-digital converter ADC1-1 and ADC1-2, the second sub-switch is connected between the analogue-to-digital converters ADC2-1 and ADC2-2, and the fifth sub-switch is connected between the between the analogue-to-digital converters ADC1-1 and ADC2-2.

8. The image sensor according to claim 1, wherein the primary merging output mode comprises at least one of an additive mode, a digital averaging mode, and a combination mode;

in the additive mode, charges of all of the plurality of sub-pixels in one of the plurality of pixels are accumulated in the floating diffusion region to obtain total charges, and the analogue-to-digital conversion is performed on the total charges to obtain a converted signal, and the converted signal is read out;

in the digital averaging mode, performing the analogue-to-digital conversion on charges, which are generated by each of the plurality of sub-pixels in one of the plurality of pixels at different time points, to obtain a plurality of converted digital signals, the plurality of converted digital signals are averaged to obtain an average digital signal, and the average digital signal is read out;

in the average digital signal, for one of the plurality of pixels, charges of a first portion of the plurality of sub-pixels are accumulated in the floating diffusion region to generate a first analogue signal, the analogue-to-digital conversion is performed on the first analogue signal to output a first digital signal; charges of a second portion of the plurality of sub-pixels are accumulated in the floating diffusion region to generate a second analogue signal, the analogue-to-digital conversion is performed on the second analogue signal to output a second digital signal; the first digital signal and the second digital signal are averaged to obtain an average digital signal, and the average digital signal is read out; wherein, the first portion of the plurality of sub-pixels and the second portion of the plurality of sub-pixels constitute one of the plurality of pixels.

9. The image sensor according to claim 8, wherein, when charges, which are accumulated in the floating diffusion region within one exposure duration, are charges from one of the plurality of photoelectric conversion elements, the pixel circuit conducts all of the plurality of output ends to output, at different time points, a plurality of analogue signals corresponding to charges of the plurality of photoelectric conversion elements to the first conversion circuit, enabling the first conversion circuit to perform the full-resolution output mode or the digital averaging mode on the plurality of analogue signals;

when charges, which are accumulated in the floating diffusion region within one exposure duration, are charges from all of the plurality of photoelectric conversion elements in one of the plurality of pixels, the pixel circuit conducts any one of the plurality of output ends to output an analogue signal corresponding to the accumulated charges to the first conversion circuit, enabling the first conversion circuit to perform the additive mode on the analogue signal;

when charges, which are accumulated in the floating diffusion region within a first exposure duration, are first accumulated charges from photoelectric conversion elements of the first portion of the plurality of sub-pixels; or when charges, which are accumulated in the floating diffusion region within a second exposure duration, are second accumulated charges from photoelectric conversion elements of the second portion of the plurality of sub-pixels, the pixel circuit conducts the plurality of output ends to output, at different time points, an analogue signal corresponding to the first accumulated charges and an analogue signal corresponding to the second accumulated charges to the first conversion circuit, enabling the first conversion circuit to perform the combination mode on the analogue signals.

10. The image sensor according to claim 1, wherein, the pixel array comprises a plurality of pixel units disposed in a one-dimensional array;

each of the plurality of pixel units comprises a first pixel, a second pixel, a third pixel and a fourth pixel arranged in a 2*2 array; each of the first pixel and the fourth pixel is a full-colour pixel, and the first pixel and the fourth pixel are disposed in a first diagonal direction; each of the second pixel and the third pixel is a coloured pixel, and the second pixel and the third pixel are disposed in a second diagonal direction; a spectral response of the coloured pixel is narrower than that of the full-colour pixel, the first diagonal direction is different from the second diagonal direction;

in one of the plurality of pixel units, two pixels located in one column share one of the plurality of first conversion circuits, two of the plurality of first conversion circuits for two pixels located in one row are connected to each other, the two first conversion circuits that are connected to each other are further configured to read out digital signals based on a secondary merging output mode; the secondary merging output mode is configured to read out the digital signals by taking all pixels located in the second diagonal direction as a unit.

11. The image sensor according to claim 10, wherein each of the plurality of pixels comprises four sub-pixels arranged in a 2*2 array; each of the plurality of pixel units is arranged with a first column control line, a second column control line, a third column control line, and a fourth column control line; each of the plurality of pixel units further comprises a third switching unit disposed between an output end of one of the plurality of first conversion circuits and an output end of another one of the plurality of first conversion circuits; the third switching unit comprises a third switch and a fourth switch, the third switch is connected between the first column control line and the third column control line, and the fourth switch is connected between the second column control line and the fourth column control line.

12. The image sensor according to claim 11, wherein, two first conversion circuits of the plurality of first conversion circuits for one of the plurality of pixel units comprise: four analogue-to-digital converters and two fifth switches arranged at output ends of the four analogue-to-digital converters; input ends of the four analogue-to-digital converters are in one-to-one connection with the first column control line, the second column control line, the third column control line, and the fourth column control line; one of the two fifth switches is connected between the first column control line and the second column control line, the other of the two fifth switches is connected between the third column control line and the fourth column control line.

13. The image sensor according to claim 11, wherein, the pixel array comprises a plurality of pixel sets disposed in an array, each of the plurality of pixel sets comprises a first pixel unit and a second pixel unit arranged in a 2*1 array, one of the plurality of first conversion circuits corresponding to the first pixel unit is connected to another one of the plurality of first conversion circuits corresponding to the second pixel units.

14. The image sensor according to claim 13, wherein, one of the plurality of pixel sets is arranged with a first column control line set and a second column control line set, each of the first column control line set and the second column control line set comprises four column control lines, the one of the plurality of pixel sets comprises a first analogue-to-digital converter set and a second analogue-to-digital converter set, each of the first analogue-to-digital converter set and the second analogue-to-digital converter set comprises four analogue-to-digital converters;
one of the plurality of pixel sets further comprises a fifth switching unit arranged at the output end of the first conversion circuit; the fifth switching unit is connected to one digital-to-analogue converter in the first analogue-to-digital converter set and one analogue-to-digital converter of the second analogue-to-digital converter set; the fifth switching unit, when being turned on, is configured to perform an averaging operation on digital signals output from the two analogue-to-digital converters that are connected to each other.

15. The image sensor according to claim 14, wherein the switch array comprises eight single-pole and double-throw switches, a single terminal of each of the eight single-pole and double-throw switches is connected correspondingly to one column control line, one of two selection terminals of each of the eight single-pole and double-throw switches is connected to one analogue-to-digital converter in the first analogue-to-digital converter set, and one of two selection terminals of each of the eight single-pole and double-throw switches is connected to one analogue-to-digital converter in the second analogue-to-digital converter set.

16. The image sensor according to claim 13, wherein when the plurality of pixel sets are arranged in a one-dimensional array along a column direction of the pixel array, a digital signal of one pixel set of the plurality of pixel sets located in one row is read out in parallel with a digital signal of another one pixel set of the plurality of pixel sets located in another row;
the in-parallel read-out means that digital signals of all pixel sets located in one row are read out independently from digital signals of all pixel sets located in another row.

17. The image sensor according to claim 1, wherein,
the pixel array comprises a plurality of pixel units arranged in a one-dimensional array; each of the plurality of pixel units comprises a first pixel, a second pixel, a third pixel, and a fourth pixel that are arranged in a 2*2 array; each of the first pixel and the fourth pixel is a full-colour pixel, the first pixel and the fourth pixel are disposed in a first diagonal direction; each of the second pixel and the third pixel is a coloured pixel, the second pixel and the third pixel are disposed in a second diagonal direction; a spectral response of the coloured pixel narrower than that of the full-colour pixel, the first diagonal direction is different from the second diagonal direction; and
in one of the plurality of pixel units, two pixels of the first pixel, the second pixel, the third pixel, and the fourth pixel are arranged in one row; two first conversion circuits of the plurality of first conversion circuits are respectively connected to the two pixels; and the two first conversion circuits are connected to each other.

18. The image sensor according to claim 1, wherein the pixel circuit further comprises:
a plurality of transfer transistors, in one-to-one connection with the plurality of photoelectric conversion elements and configured to transfer the charges generated by the plurality of photoelectric conversion elements to the floating diffusion region; and
a readout circuit, comprising an input end and a plurality of output ends, wherein the input end of the readout circuit is connected to the floating diffusion region to enable the charges, which are transferred into the floating diffusion region, to be output from at least one of the plurality of output ends.

19. A camera assembly, comprising:
a lens; and
an image sensor, wherein the image sensor is configured to receive light that passes through the lens;
wherein the pixel array comprises a plurality of pixels, each of the plurality of pixels comprises a plurality of sub-pixels, wherein the plurality of sub-pixels in one of the plurality of pixels share one floating diffusion region; each of the plurality of pixels comprises a pixel circuit arranged with a plurality of output ends, the pixel circuit comprises a plurality of photoelectric conversion elements in one-to-one correspondence with the plurality of sub-pixels; the pixel circuit is configured to transfer charges, which are generated by at least one of the plurality of photoelectric conversion elements in the one of the plurality of pixels, to the floating diffusion region, the transferred charges are accumulated in the floating diffusion region; the pixel circuit is configured to select, based on the accumulated charges, at least one of the plurality of output ends of the pixel circuit to output an analogue signal corresponding to the charges in the floating diffusion region;

a plurality of first conversion circuits, corresponding to a plurality pixel circuits of the plurality of pixels, wherein each of the plurality of first conversion circuits is connected to the plurality of output ends of one of the plurality of pixel circuits; for each of the plurality of first conversion circuits and a corresponding one of the plurality pixel circuits corresponding to one of the plurality of pixels, the first conversion circuit is configured to perform analogue-to-digital conversion on the analogue signal output from the pixel circuit and to read out, cooperatively with the pixel circuit, a digital signal after the conversion based on either a full-resolution output mode or a primary merging output mode; wherein the full-resolution mode means that the digital signal is read out taking one sub-pixel as a unit, and the primary merging output mode means that the digital signal is read out taking one pixel as a unit.

20. A mobile terminal, comprising:

a housing; and the camera assembly of claim 19, wherein the camera assembly is coupled with the housing.

\* \* \* \* \*